(12) United States Patent
Grill

(10) Patent No.: US 12,496,550 B2
(45) Date of Patent: *Dec. 16, 2025

(54) BIOGAS HALOGEN PROCESSING SYSTEMS AND METHODS

(71) Applicant: Stearns, Conrad and Schmidt, Consulting Engineers, Inc., Reston, VA (US)

(72) Inventor: Jeffrey Grill, Cypress, CA (US)

(73) Assignee: Stearns, Conrad And Schmidt, Consulting Engineers, Inc.

( * ) Notice: Subject to any disclaimer, the term of this patent is extended or adjusted under 35 U.S.C. 154(b) by 11 days.

This patent is subject to a terminal disclaimer.

(21) Appl. No.: 18/740,992

(22) Filed: Jun. 12, 2024

(65) Prior Publication Data

US 2024/0325973 A1    Oct. 3, 2024

Related U.S. Application Data

(63) Continuation-in-part of application No. 18/634,033, filed on Apr. 12, 2024, which is a continuation-in-part of application No. 18/169,377, filed on Feb. 15, 2023.

(51) Int. Cl.
*B01D 53/68* (2006.01)
*B01D 53/02* (2006.01)
(Continued)

(52) U.S. Cl.
CPC ............. *B01D 53/76* (2013.01); *B01D 53/26* (2013.01); *B01D 53/52* (2013.01); *B01D 53/68* (2013.01); *B01D 53/75* (2013.01); *B01D 53/8659* (2013.01); *B01D 53/02* (2013.01); *B01D 53/1468* (2013.01); *B01D 2251/202* (2013.01);
(Continued)

(58) Field of Classification Search
CPC .... B01D 53/02; B01D 53/1468; B01D 53/26; B01D 53/52; B01D 53/68; B01D 53/75; B01D 53/76; B01D 53/8659; B01D 2251/202; B01D 2257/20; B01D 2257/304; B01D 2257/502; B01D 2257/504; B01D 2257/80; B01D 2258/05
See application file for complete search history.

(56) References Cited

U.S. PATENT DOCUMENTS 7,625,539 B2 * 12/2009 Van Den Brand ............................ C01B 17/0452
423/563
9,217,116 B2 * 12/2015 Huang ................... C10L 3/102
(Continued)

OTHER PUBLICATIONS

Yan et al. ("Kinetics and Mechanisms of H2S Adsorption by Alkaline Activated Carbon." Environ. Sci. Technol. 2002, 36, 4460-4466) (Year: 2002).*

*Primary Examiner* — Youngsul Jeong
*Assistant Examiner* — Jason Y Chong
(74) *Attorney, Agent, or Firm* — Maier & Maier, PLLC

(57) ABSTRACT

A method to produce a halogen-depleted gas is described. The method providing a gas derived from and/or including a source of biogas, mixing said gas with a source of hydrogen to produce a processed gas mixture including an acid, and separating said acid from said processed gas mixture. Sulfur, oxygen, carbon dioxide removal processes are integrated into the method. Production of secondary products, and removal thereof, are included. Pre and post processing may be integrated, and production of products is described.

29 Claims, 9 Drawing Sheets

(51) Int. Cl.
*B01D 53/26* (2006.01)
*B01D 53/52* (2006.01)
*B01D 53/73* (2006.01)
*B01D 53/75* (2006.01)
*B01D 53/76* (2006.01)
*B01D 53/86* (2006.01)
*B01D 53/14* (2006.01)

(52) U.S. Cl.
CPC .... *B01D 2257/20* (2013.01); *B01D 2257/304* (2013.01); *B01D 2257/502* (2013.01); *B01D 2257/504* (2013.01); *B01D 2257/80* (2013.01); *B01D 2258/05* (2013.01)

(56) References Cited

U.S. PATENT DOCUMENTS

2007/0068386 A1 3/2007 Mitariten
2021/0402368 A1 12/2021 Baek et al.

\* cited by examiner

HALOGEN PROCESSING SYSTEM

PRODUCT PRODUCTION SYSTEM

TWO-STAGE VOLATILE ORGANIC COMPOUND PROCESSING

HALOGEN PROCESSING SYSTEM

HALOGEN PROCESSING SYSTEM

HALOGEN PROCESSING SYSTEM

BIOGAS HALOGEN PROCESSING SYSTEMS AND METHODS

RELATED APPLICATIONS

This application is a Continuation-In-Part of my patent application Ser. No. 18/634,033, filed on Apr. 12, 2024 which is a Continuation-In-Part of my patent application Ser. No. 18/169,377, filed on Feb. 15, 2023. The contents of the aforementioned applications are incorporated by reference in their entirety.

TECHNICAL FIELD

The present disclosure relates to improvements to processing of biogas and production of biogas-related products.

BACKGROUND

Biogas is produced by the biological breakdown of organic matter. Methane is an important constituent of biogas which may be processed to produce a variety of valuable products. However, some biogas sources include problematic contaminants such as halogens, halogen-derived contaminants, and additionally some sources of biogas include halogenated volatile organic compounds which could be prone to having the halogen dissociate therefrom to form other undesirable compounds.

A halogen within a source of biogas and/or from a gas derived from a source of biogas can cause problems to owners and operators of biogas processing facilities. For example, halogens within biogas can form an acid and/or may recombine to form undesirable compounds which may cause corrosion of metal components, blockage within piping of viscous deposits of organic chlorides (e.g. green oil, etc.), within biogas processing equipment and can result in added replacement and unexpected repair costs in the facility. As a result, replacement of corroded equipment within the biogas processing system can result in lost profits due to plant down time while not producing a sellable product. Further, and most important, corrosion of biogas processing equipment and piping can lead to safety issues, for example, asset failure, such as a ruptured equipment item or pipe in a pressurized environment can result in plant personnel being exposed to less than desirable working conditions.

Further, it is of importance to owners and operators of biogas processing facilities to adhere to stringent quality control measures to deliver a high-quality, predictable product to the end-user, that is not contaminated with a halogen and/or undesirable compounds which may cause further problems for the Utility and/or downstream consumer.

Therefore, a need exists to reliably produce a biogas-related product that has undergone acid processing, halogen processing, and/or a halogenated volatile organic compound processing to maintain consistent and safe operations of the biogas processing facility, while protecting assets to avoid and reduce additional costs, and to produce a safe and on-specification biogas-related product to the Utility and/or downstream consumer.

SUMMARY

This Summary is provided merely to introduce certain concepts and not to identify any key or essential features of the claimed subject matter.

In embodiments, the method to produce a halogen-depleted biogas, comprises:

providing a halogen-laden biogas comprising a halogen; said halogen-laden biogas includes and/or is derived from a source of biogas;

providing a halogen processing system comprising a material, said halogen processing system is configured to accept said halogen-laden biogas and to contact said halogen-laden biogas with said material within said halogen processing system to remove at least a portion of said halogen within said halogen-laden biogas to produce said halogen-depleted biogas, said halogen-depleted biogas comprises a reduced amount of said halogen relative to said halogen-laden biogas;

supplying said halogen-laden biogas to said halogen processing system, wherein within said halogen processing system said halogen-laden biogas is contacted with said material to remove said at least a portion of said halogen from said halogen-laden biogas to produce said halogen-depleted biogas, wherein said halogen-depleted biogas comprises a reduced amount of said halogen relative to said halogen-laden biogas.

In embodiments, said halogen processing system comprises a vessel, wherein said vessel comprises an interior with said material positioned within said interior; and said method further comprises supplying said halogen-laden biogas to said vessel, wherein said halogen-laden biogas contacts said material positioned within said interior of said vessel to produce said halogen-depleted biogas.

In embodiments, said halogen processing system comprises a plurality of vessels, wherein each of said plurality of vessels comprise an interior with said material positioned within said interior; said plurality of vessels comprises a first vessel and a second vessel; said first vessel is configured to accept said biogas and/or from a gas derived from a source of biogas and to remove a first portion of said halogen therefrom to produce an intermediate halogen-depleted biogas by contacting said biogas and/or from a gas derived from a source of biogas with said material within said first vessel; said second vessel is configured to accept said intermediate halogen-depleted biogas from said first vessel and to remove a second portion of said halogen therefrom to produce said halogen-depleted biogas by contacting said intermediate halogen-depleted biogas with said material included within said second vessel; and said method further comprises:

supplying said halogen-laden biogas to said first vessel to remove said first portion of said halogen therefrom to produce said intermediate halogen-depleted biogas by contacting said halogen-laden biogas with said material within said first vessel; and supplying said intermediate halogen-depleted biogas from said first vessel to said second vessel to remove said second portion of said halogen therefrom to produce said halogen-depleted biogas by contacting said intermediate halogen-depleted biogas with said material included within said second vessel;

wherein:

said intermediate halogen-depleted biogas comprises a reduced amount of halogen relative to said halogen-laden biogas; and said halogen-depleted biogas comprises a reduced amount of halogen relative to said intermediate halogen-depleted biogas.

In embodiments, said material within said second vessel comprises a type of material different from said material within said first vessel.

In embodiments, said halogen-laden biogas is a pre-processed biogas; and said method further comprises:
provproviding a pre-processing system configured to accept a source of biogas and/or a gas derived from a source of biogas and to process said source of biogas and/or said gas derived from said source of biogas to produce a pre-processed biogas;
supplying a source of biogas and/or said gas derived from said source of biogas to said pre-processing system, and within said pre-processing system, processing said source of biogas and/or said gas derived from said source of biogas to produce said pre-processed biogas; and
supplying said pre-processed biogas to said halogen processing system as said halogen-laden biogas, to produce said halogen-depleted biogas.

In embodiments, said pre-processing system comprises one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, the method further comprises:
providing a post-processing system configured to accept said halogen-depleted biogas from said halogen processing system and process said halogen-depleted biogas in said post-processing system to produce a product; and
supplying said halogen-depleted biogas from said halogen processing system to said post-processing system, and within said post-processing system, processing said halogen-depleted biogas to produce said product.

In embodiments, said post-processing system comprises one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, the method further comprises:
providing a post-processing system configured to accept said halogen-depleted biogas from said halogen processing system and process said halogen-depleted biogas in said post-processing system to produce a product; and
supplying said halogen-depleted biogas from said halogen processing system to said post-processing system, and within said post-processing system, processing said halogen-depleted biogas to produce said product.

In embodiments, said post-processing system comprises one or more processing systems selected from the group consisting of water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, said pre-processing system comprises one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, said product comprises one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, a hydrocarbon, a non-halogenated hydrocarbon, a lipid, an emulsion, diesel, and power.

In embodiments, the method further comprises:
providing a pre-processing system configured to accept a source of biogas and/or a gas derived from a source of biogas, said source of biogas and/or said gas derived from said source of biogas further comprises one or more selected from the group consisting of oxygen and a halogenated volatile organic compound, and to subject said source of biogas and/or said gas derived from said source of biogas to a heating process and/or combustion process within said pre-processing system to produce a pre-processed biogas; said pre-processed biogas comprises a reduced amount of said oxygen, and/or a reduced amount of said halogenated volatile organic compound relative to said source of biogas and/or said gas derived from said source of biogas, wherein a halogen portion of said halogenated volatile organic compound is dissociated into said halogen by said heating process and/or combustion process, wherein said halogen may combine with water vapor, hydrogen, an ion, and/or an electron donor within said pre-processed biogas to produce an acid, said pre-processed biogas comprises said halogen and/or said acid, and said pre-processing system is further configured to evacuate said pre-processed biogas from said pre-processing system and to supply said pre-processed biogas said halogen processing system;

supplying a source of biogas and/or a gas derived from a source of biogas to said pre-processing system, and within said pre-processing system, subjecting said source of biogas and/or said gas derived from said source of biogas to said heating process and/or combustion process to produce said pre-processed biogas, said pre-processed biogas comprises a reduced amount of said oxygen, and/or a reduced amount of said halogenated volatile organic compound relative to said source of biogas and/or said gas derived from said source of biogas, wherein said halogen portion of said halogenated volatile organic compound is dissociated into said halogen by said heating process and/or said combustion process, wherein said halogen may combine with said water vapor within said pre-processed biogas to produce said acid; and supplying said pre-processed biogas to said halogen processing system to remove said halogen and/or said acid from said halogen-laden biogas, to produce said halogen-depleted biogas.

In embodiments, said halogen-depleted biogas further comprises water vapor; and said method further comprises:
providing a post-processing system configured to accept said halogen-depleted biogas and to remove water vapor from said halogen-depleted biogas to produce a product; and
supplying said halogen-depleted biogas from said halogen processing system to said post-processing system, and within said post-processing system, removing said water vapor from said halogen-depleted biogas to produce said product.

In embodiments, the method further comprises condensing said water vapor removed from said halogen-depleted biogas within said post-processing into liquid water comprising an acid; and neutralizing said acid within said liquid water with a base.

In embodiments, said halogen-laden biogas is one or more selected from the group consisting of:
halogen-laden biogas derived from and/or produced in and collected from an anerobic digester;
halogen-laden biogas derived from and/or produced in and collected from a landfill; and
halogen-laden biogas derived from and/or produced in and collected from a waste water treatment facility.

In embodiments, said material comprises an adsorbent.

In embodiments, said material comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, said material comprises spheres comprising a diameter ranging from 0.015625 to 5 inches.

In embodiments, said halogen-laden biogas comprises a halogen content ranging from 0.0005 to 100,000 parts per million.

In embodiments, said halogen-depleted biogas comprises a halogen content less than 100,000 parts per billion.

In embodiments, a product production system (1000) for producing a product from a source of biogas and/or a gas derived from a source of biogas (A0), said biogas comprises a halogen, the system comprises:
a pre-processing system (A) configured to accept said source of biogas and/or a gas derived from a source of biogas (A0) and to process said biogas and/or said gas derived from said source of biogas (A0) within said pre-processing system (A) to produce a pre-processed gas (A3), and said pre-processing system (A) being further configured to evacuate said pre-processed gas (A3) from said pre-processing system (A) and to supply said pre-processed gas (A3) to a halogen processing system (100);
said halogen processing system (100) configured to accept said pre-processed gas (A3) from said pre-processing system (A), said halogen processing system (100) is configured to remove said halogen from said pre-processed gas (A3) to produce a halogen-depleted gas (55), said halogen processing system (100) being further configured to evacuate said halogen-depleted gas (55) from said halogen processing system (100) and to supply said halogen-depleted gas (55) to a post-processing system (B), wherein said halogen-depleted gas (55) comprises a reduced amount of said halogen relative to said pre-processed gas (A3); and
said post-processing system (B) configured to accept said halogen-depleted gas (55) from said halogen processing system (100) and to process said halogen-depleted gas (55) within said post-processing system (B) to produce said product (B3).

In embodiments, said halogen processing system (100) comprises a material (40), and within said halogen processing system (100) contacting said pre-processed gas (A3) with said material (40) to remove at least a portion of said halogen from said pre-processed biogas (A3) to produce said halogen-depleted gas (55); wherein:
said material (40) comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, said pre-processing system (A) is configured to process said source of biogas and/or a gas derived from a source of biogas (A0) to produce said pre-processed gas (A3) by one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, said post-processing system (B) is configured to process said halogen-depleted gas (55) to produce said product (B3) by one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, said pre-processing system (A) is configured to process said source of biogas and/or said gas derived from said source of biogas (A0) to produce said pre-processed gas (A3) by one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms; and said post-processing system (B) is configured to process said halogen-depleted gas (55) to produce said product (B3) by one or more processing systems selected from the group consisting of a water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

BRIEF DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

DETAILED DESCRIPTION

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1

Figure 1:
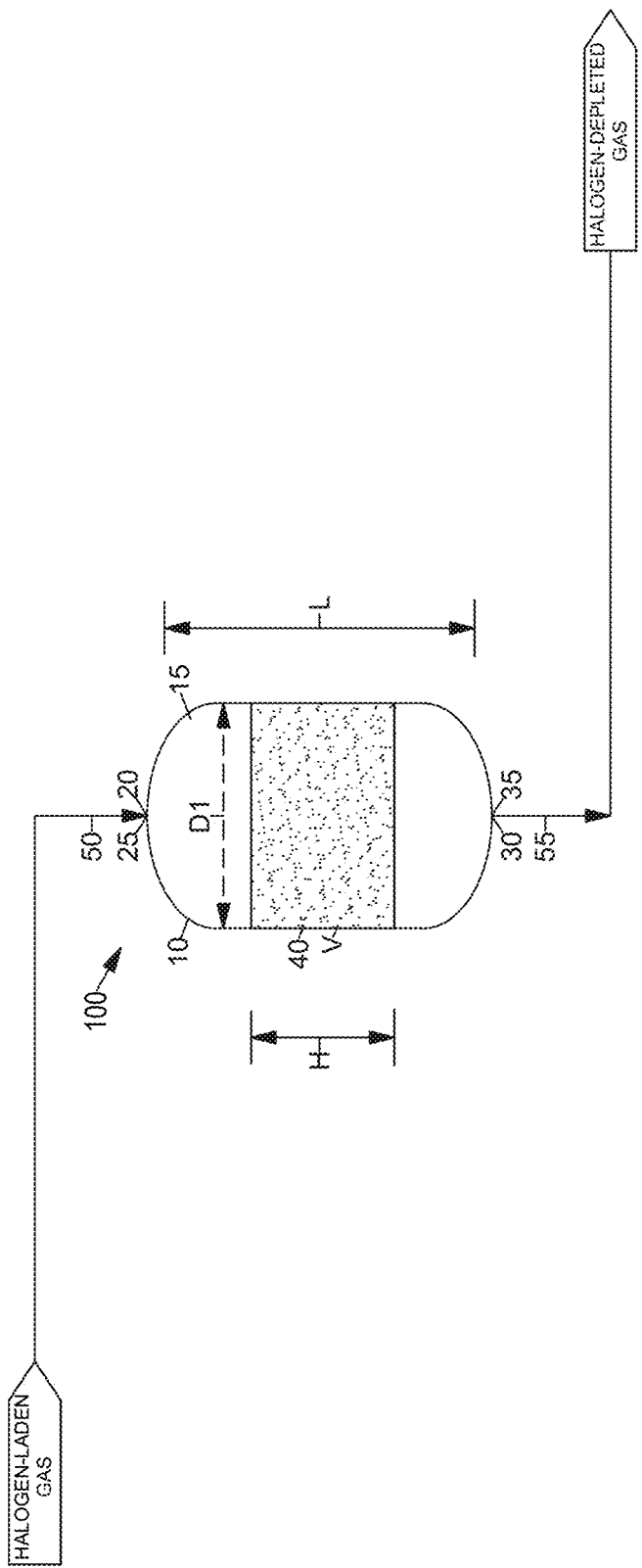
FIG. 1 depicts a non-limiting embodiment of a halogen processing system (100) for use in removing halogen from a gas derived from and/or including a source of biogas.

FIG. 1 depicts a non-limiting embodiment of a halogen processing system (100) for use in removing a halogen from a gas derived from and/or including a source of biogas.

In embodiments, the halogen processing system (100) comprises a material (40) for removing halogen from the biogas by contacting said biogas with said material (40) within said halogen processing system (100).

In embodiments, the halogen processing system (100) comprises a vessel (10) comprising a material (40). In embodiments, said material (40) comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite. In embodiments, the material (40) comprises a media including a metal or a plurality of metals.

In embodiments, the vessel (10) comprises an adsorber including a material (40) comprising an adsorbent. In embodiments, the vessel (10) includes an interior (15) with a material (40) contained within the interior (15).

In embodiments, the vessel (10) is vertically-oriented and comprises a top (25) and a bottom (35). In embodiments, the vessel (10) has an inlet (20) at the top (25) and an outlet (30) at the bottom (35). In embodiments, the vessel (10) has an inlet (20) at the bottom (35) and an outlet (30) at the top (25). In embodiments, a halogen-laden gas (50) is supplied to the inlet (20) of the vessel (10) and a halogen-depleted gas (55) is evacuated from the interior (15) of the vessel (10) via the outlet (30). In embodiments, the vessel (10) comprises a system that is not vertically-oriented wherein the top (25) is a first end and the bottom (35) is a second end where a halogen-depleted biogas exits.

In embodiments, the vessel (10) accepts a halogen-laden gas (50) which travels down through the vessel (10) from the top (25) to the bottom (35). In embodiments, the vessel (10) accepts a halogen-laden gas (50) which travels down through the vessel (10) from the inlet (20) to the outlet (30). In embodiments, the vessel (10) accepts a halogen-laden gas (50) which travels down through the vessel (10) from the outlet (30) to the inlet (20). In embodiments, the vessel (10) accepts a halogen-laden gas (50) which travels upwards through the vessel (10) from the bottom (35) to the top (25).

In embodiments, the halogen-laden gas (50) includes a gas derived from and/or including a source of biogas, comprising at least a halogen, and the gas derived from and/or including a source of biogas is provided to the halogen processing system (100) wherein the gas derived from and/or including a source of biogas contacts the material (40) within the halogen processing system (100) to remove the halogen therefrom to produce a halogen-depleted gas (55), wherein the halogen-depleted gas (55) comprises a reduced amount of the halogen relative to the halogen-laden gas (50).

In embodiments, a halogenated volatile organic compound comprises a halogen. In embodiments, the halogen is included within a halogenated volatile organic compound. In embodiments, the halogen processing system (100) processes and/or removes at least a portion of a halogenated volatile organic compound and/or at least a portion of a halogen from the halogen-laden gas (50) to produce the halogen-depleted gas (55).

In embodiments, an acid comprises a halogen. In embodiments, the halogen is included within an acid. In embodiments, the halogen processing system (100) processes and/or removes at least a portion of an acid and/or at least a portion of a halogen from the halogen-laden gas (50) to produce the halogen-depleted gas (55).

In embodiments, the acid includes an organic acid. In embodiments, non-limiting examples of the organic acid comprise one or more organic acids selected from the group consisting of abietic acid, acetic acid, adipic acid, azelaic acid, barbituric acid, benzoic acid, butyric acid, cacodylic acid, camphoric acid, cinnamic acid, citric acid, cyanuric acid, decanoic acid, diglycolic acid, formic acid, gallic acid, gluconic acid, glycerophosphoric acid, glycolic acid, humic acid, isobutyric acid, lactic acid, maleic acid, malic acid, mandelic acid, oxalic acid, pamoic acid, phthalic acid, picric acid, p-toluenesulfonic acid, salicylic acid, succinic acid, tannic acid, tartaric acid, tartronic acid, tetronic acid, thiodiglycolic acid, thiosalicylic acid, tiglic acid, trichloroacetic acid, trifluoroacetic acid, valeric acid, and vanillic acid.

In embodiments, the acid includes an inorganic acid. In embodiments, non-limiting examples of the inorganic acid comprise one or more inorganic acids selected from the group consisting of boric acid, chlorosulfonic acid, chromosulfuric acid, fluoroboric acid, fluosilicic acid, hydriodic acid, hydrobromic acid, hydrochloric acid, hydrofluoric acid, iodic acid, metaphosphoric acid, nitric acid, perchloric acid, periodic acid, phosphomolybdic acid, phosphoric acid, phosphorous acid, phosphotungstic acid, polyphosphoric acid, selenous acid, silicic acid, sulfamic acid, sulfuric acid, and sulfurous acid. In embodiments, the acid includes a sulfonic acid.

In embodiments, the acid comprises a polyatomic ion. In embodiments, the acid does not comprise a polyatomic ion. In embodiments, the acid includes a compound other than carbon dioxide ($CO_2$), hydrogen sulfide ($H_2S$), sulfur dioxide ($SO_2$), sulfur trioxide ($SO_3$), carbonyl sulfide (COS), carbon disulfide ($CS_2$), and a mercaptan.

In embodiments, the halogen contacts the material (40) within the halogen processing system (100). In embodiments, the halogen-laden gas (50) is supplied to the material (40) wherein at least a portion of the halogen within the halogen-laden gas (50) is removed by the material (40) to produce the halogen-depleted gas (55), wherein the halogen-depleted gas (55) has a reduced amount of the halogen relative to the halogen-laden gas (50). In embodiments, the material (40) contacts the at least the portion of the halogen and processes the halogen, wherein the processing of the halogen removes it from the halogen-laden gas (50).

In embodiments, the material (40) contacts the at least the portion of the halogen and processes the halogen, wherein the processing of the halogen dissociates, reacts, combines, adsorbs, absorbs, deposits, fuses, attracts, adheres, clings, binds, unites, joins, assimilates, polymerizes, converts, catalyzes, at least a portion of the halogen from the halogen-laden gas (50) with, onto, into, in response to, within, with the assistance of, and/or on a surface of at least a portion of the material (40).

In embodiments, the material (40) contacts at least the portion of the halogen and dissociates, reacts, combines, adsorbs, absorbs, deposits, fuses, attracts, adheres, clings, binds, unites, joins, assimilates, converts, catalyzes, at least a portion of the halogen from the halogen-laden gas (50) with, onto, into, in response to, within, with the assistance of, and/or on a surface of at least a portion of said material (40).

In embodiments, the material (40) contacts at least a portion of the halogen and at least a portion of the halogen dissociates reacts, combines, adsorbs, absorbs, deposits, fuses, attracts, adheres, clings, binds, unites, joins, assimilates, converts, polymerizes, and/or catalyzes, with, onto, into, in response to, within, with the assistance of, and/or on a surface of at least a portion of said material (40).

In embodiments, at least a portion of the halogen contacts at least a portion of the material (40) and at least a portion of the halogen dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material (40).

In embodiments, at least a portion of the halogen contacts at least a portion of the material (40) and at least a portion of the halogen dissociates, reacts, combines, adsorbs, absorbs, deposits, fuses, attracts, adheres, clings, binds, unites, joins, assimilates, converts, polymerizes, and/or catalyzes, to form a salt with, onto, into, in response to, within, with the assistance of, and/or on a surface of at least a portion of said material (40).

In embodiments, at least a portion of the halogen contacts at least a portion of the material (40) and at least a portion of the halogen dissociates, reacts, combines, adsorbs, absorbs, deposits, fuses, attracts, adheres, clings, binds, unites, joins, assimilates, converts, polymerizes, and/or catalyzes, to form an acid with, onto, into, in response to, within, with the assistance of, and/or on a surface of at least a portion of said material (40).

In embodiments, at least a portion of the halogen contacts at least a portion of the material (40) and at least a portion of the halogen dissociates, reacts, combines, adsorbs, absorbs, deposits, fuses, attracts, adheres, clings, binds, unites, joins, assimilates, converts, polymerizes, and/or catalyzes, to form a primary compound and/or a plurality of primary compounds with, onto, into, in response to, within, with the assistance of, and/or on a surface of at least a portion of said material (40). In embodiments the primary compound includes a salt and/or an acid.

In embodiments, the halogen-laden gas (50) is supplied to the material (40) wherein at least a portion of the halogen-laden gas (50), other than the halogen, is removed by the material (40). In embodiments, at least a portion of the halogen-laden gas (50), other than the halogen, contacts at least a portion of the material (40) at least a portion of the halogen-laden gas (50), other than the halogen, dissociates, reacts, combines, adsorbs, absorbs, deposits, fuses, attracts, adheres, clings, binds, unites, joins, assimilates, converts, polymerizes, and/or catalyzes, to form a secondary compound, and/or a plurality of secondary compounds, with, onto, into, in response to, within, with the assistance of, and/or on a surface of at least a portion of said material (40).

In embodiments, the material (40) forms a primary compound, and/or a secondary compound. In embodiments, the material (40) forms a salt, an acid, a primary compound, and/or a secondary compound from at least a portion of the halogen and/or at least a portion of the halogen-laden gas (50), other than the halogen. In embodiments, the material (40) forms a primary compound, and/or a secondary compound, to produce the halogen-depleted gas (55).

In embodiments, the material (40) forms a primary compound, and/or a secondary compound, wherein the material (40) comprises a non-regenerable material and is changed-out over a time duration, said time duration comprises one or more time durations selected from the group consisting of: 1 week to 1 month, 1 to 2 months, 2 to 3 months, 3 to 4 months, 4 to 5 months, 5 to 6 months, 6 to 8 months, 8 months to 1 year, 1 to 1.5 years, 1.5 to 2 years, 2 to 2.5 years, 2.5 to 3 years, 3 to 3.5 years, 3.5 to 4 years, 4 to 4.5 years, 4.5 to 5 years, 5 to 6 years, 6 to 7 years, 7 to 8 years, 8 to 9 years, 9 to 10 years, 10 to 15 years, 15 to 20 years, and 20 to 30 years. In embodiments, material replacement or change out is determined by breakthrough of an undesirable compound from the halogen processing system (100), such as the discharge of relatively more undesirable compounds over time, and/or upon exceeding a pre-determined discharge concentration of undesirable compounds evacuated from the halogen processing system (100).

In embodiments, the halogen and/or at least a portion of the halogen-laden gas (50), other than the halogen, forms a salt, an acid, a primary compound, and/or a secondary compound to avoid production of undesirable compound, and/or a plurality of undesirable compounds, wherein the undesirable compound is different than the salt, the acid, the primary compound, and/or the secondary compound. In embodiments, the halogen and/or at least a portion of the halogen-laden gas (50), other than the halogen, forms a salt, an acid, a primary compound, and/or a secondary compound to avoid production of undesirable compound, wherein the undesirable compound comprises a substance other than the primary and/or the secondary compound.

In embodiments, the undesirable compound may be condensed into a liquid hydrocarbon. In embodiments, the undesirable compound may be condensed into a mixture of hydrocarbons. In embodiments, the undesirable compound may be condensed into a mixture of a liquid hydrocarbon and water. In embodiments, the undesirable may be condensed into an emulsion comprising a mixture of a liquid hydrocarbon and water. In embodiments, the undesirable compound may be a liquid hydrocarbon. In embodiments, the undesirable compound may be a high-molecular weight polymer, a long-chain polymer, and/or a tar. In embodiments, at least a portion of the undesirable compound may be separated from at least a portion of the halogen-depleted gas (55).

In embodiments, the undesirable compound may be a compound produced by a polymerization reaction. In embodiments, the undesirable compound may be a halogenated hydrocarbon, halogenated inorganic compound, a halogenated organic compound, non-halogenated hydrocarbon, non-halogenated inorganic compound, and/or a non-halogenated organic compound. In embodiments, the halogen and/or at least a portion of the halogen-laden gas (50), other than the halogen, dissociates, reacts, combines, adsorbs, absorbs, deposits, fuses, attracts, adheres, clings, binds, unites, joins, assimilates, converts, polymerizes, and/or catalyzes with, onto, into, in response to, within, with the assistance of, and/or on a surface of at least a portion of said material (40), to produce the halogen-depleted gas (55).

In embodiments, the halogen and/or at least a portion of the halogen-laden gas (50), other than the halogen, dissociates, reacts, combines, adsorbs, absorbs, deposits, fuses, attracts, adheres, clings, binds, unites, joins, assimilates, converts, polymerizes, and/or catalyzes, with, onto, into, in response to, within, with the assistance of, and/or on a surface of at least a portion of said material (40), to form a salt, an acid, a primary compound, and/or a secondary compound.

In embodiments, a halogen-laden gas (50) is supplied to the inlet (20) at the top (25) of the vessel (10) and a halogen-depleted gas (55) is transferred from the interior (15) of the vessel (10) via the outlet (30) at the bottom (35).

A halogen is removed from the halogen-laden gas (50), which includes a biogas, and/or a portion of a biogas, by utilizing the material (40) to remove the halogen therefrom to produce a halogen-depleted gas (55) which is then evacuated from the vessel (10). The halogen-depleted gas (55) has a lesser amount of the halogen relative to the halogen-laden gas (50). Ideally complete removal of halogen is desired however some residual amount of the halogen may slip-through and not become completely removed by the material (40) within the halogen processing system (100), and therefore part per billion level or a part per million amount of the halogen may be present in the biogas that is evacuated from the halogen processing system (100). In embodiments, the halogen-depleted gas (55) has a reduced amount of halogen relative to the halogen-laden gas (50). A gas quality sensor may be provided to monitor the concentration of halogen in the gas (55) discharged from the halogen processing system (100).

In embodiments, the vessel (10) comprises a diameter (D1) and a vessel length (L). The material (40) within the interior (15) of the vessel (10) comprises a material volume (V) and comprises a material height (H) of the material (40) within the vessel (10). In embodiments, the diameter (D1) of the vessel (10) comprises one or more selected from the group consisting of 0.125 to 0.25 foot, 0.25 to 1 foot, 1 to 2 feet, 2 to 3 feet, 3 to 4 feet, 4 to 5 feet, 5 to 6 feet, 6 to 7 feet, 7 to 8 feet, 8 to 9 feet, 9 to 10 feet, 10 to 12 feet, 12 to 14 feet, 14 to 16 feet, 16 to 18 feet, and 18 to 20 feet.

In embodiments, the material height (H) of the material (40) within the interior (15) of the vessel (10) comprises one or more selected from the group consisting of 6 inches to 1 foot, 1 to 2 feet, 2 to 3 feet, 3 to 4 feet, 4 to 5 feet, 5 to 6 feet, 6 to 7 feet, 7 to 8 feet, 8 to 9 feet, 9 to 10 feet, 10 to 11 feet, 11 to 12 feet, 12 to 13 feet, 13 to 14 feet, 14 to 15 feet, 15 to 16 feet, 16 to 17 feet, 17 to 18 feet, 18 to 19 feet, 19 to 20 feet, 20 to 25 feet, 25 to 30 feet, 30 to 35 feet, 35 to 40 feet, 40 to 45 feet, and 45 to 50 feet. In embodiments, the diameter (D1) is 5 feet, the material height (H) is 15 feet, and the material volume (V) comprises 295 cubic feet of the material (40). In embodiments, the diameter (D1) of the vessel (10) ranges from 3 to 8 feet, the material height (H) ranges from 10 to 25 feet, and the material volume (V) ranges from 71 to 20,000 cubic feet of the material (40).

In embodiments, the material volume (V) within the interior (15) of the vessel (10) comprises one or more selected from the group consisting of 0.05 to 0.5 cubic feet, 0.5 to 4 cubic feet, 4 to 12 cubic feet, 12 to 16 cubic feet, 16 to 24 cubic feet, 24 to 35 cubic feet, 35 to 47 cubic feet, 47 to 63 cubic feet, 63 to 94 cubic feet, 94 to 98 cubic feet, 98 to 106 cubic feet, 106 to 141 cubic feet, 141 to 188 cubic feet, 188 to 192 cubic feet, 192 to 212 cubic feet, 212 to 251 cubic feet, 251 to 295 cubic feet, 295 to 318 cubic feet, 318 to 377 cubic feet, 377 to 393 cubic feet, 393 to 424 cubic feet, 424 to 565 cubic feet, 565 to 577 cubic feet, 577 to 589 cubic feet, 589 to 754 cubic feet, 754 to 770 cubic feet, 770 to 848 cubic feet, 848 to 954 cubic feet, 954 to 1005 cubic feet, 1005 to 1155 cubic feet, 1155 to 1178 cubic feet, 1178 to 1272 cubic feet, 1272 to 1508 cubic feet, 1508 to 1571 cubic feet, 1571 to 1696 cubic feet, 1696 to 1909 cubic feet, 1909 to 2309 cubic feet, 2309 to 2356 cubic feet, 2356 to 3016 cubic feet, 3016 to 3393 cubic feet, 3393 to 3817 cubic feet, 3817 to 4618 cubic feet, 4618 to 4712 cubic feet, 4712 to 6032 cubic feet, 6032 to 7634 cubic feet, 7634 to 9425 cubic feet, 9425 to 15707 cubic feet, 15707 to 20000 cubic feet.

In embodiments, the material (40) comprises one or more materials selected from the group consisting of an adsorbent, activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite. In embodiments, the material (40) comprises an adsorbent. In embodiments, the material (40) comprises an absorbent.

In embodiments, the material (40) comprises a metal. In embodiments, the material (40) comprises a plurality of metals. In embodiments, the material (40) comprises an absorbent including a metal. In embodiments, the material (40) comprises an absorbent including a plurality of metals. In embodiments, the metal includes one or more metals selected from the group consisting of a precious metal, an alkali metal, an alkaline earth metal, a transition metal, a rare earth metal, an actinide, and a post-transition metal.

In embodiments, the precious metal includes one or more precious metals selected from the group consisting of a gold, silver, platinum, palladium, rhodium, iridium, osmium, and ruthenium.

In embodiments, the alkali metal includes one or more alkali metals selected from the group consisting of a lithium, sodium, potassium, rubidium, cesium, and francium.

In embodiments, the alkaline earth metal includes one or more alkaline earth metals selected from the group consisting of a beryllium, magnesium, calcium, strontium, barium, and radium.

In embodiments, the transition metal includes one or more transition metals selected from the group consisting of a scandium, titanium, vanadium, chromium, manganese, iron, cobalt, nickel, copper, zinc, yttrium, zirconium, niobium, molybdenum, technetium, ruthenium, rhodium, palladium, silver, cadmium, lutetium, hafnium, tantalum, tungsten, rhenium, osmium, iridium, platinum, gold, and mercury.

In embodiments, the rare earth metal includes one or more rare earth metals selected from the group consisting of a lanthanum, cerium, praseodymium, neodymium, promethium, samarium, europium, gadolinium, terbium, dysprosium, holmium, erbium, thulium, and ytterbium.

In embodiments, the actinide includes one or more actinides selected from the group consisting of a actinium, thorium, protactinium, uranium, neptunium, plutonium, americium, curium, berkelium, californium, einsteinium, fermium, mendelevium, nobelium, and lawrencium.

In embodiments, the post-transition metal includes one or more post-transition metals selected from the group consisting of aluminum, gallium, indium, tin, thallium, lead, bismuth, and polonium.

In embodiments, the material (40) comprises a molecular sieve. In embodiments, the material (40) comprises a zeolite. In embodiments, the material (40) comprises alumina. In embodiments, the material (40) comprises a metal. In embodiments, the halogen removal material (40) comprises a plurality of metals. In embodiments, the halogen processing system (100) comprises a scrubber including a caustic material. In embodiments, the halogen processing system (100) does not comprise a scrubber including a liquid caustic material.

In embodiments, the halogen processing system does not comprise a liquid caustic scrubber. Liquid caustic scrubbers are often too expensive, and include cost-prohibitive long term capital and operating costs. Often times, liquid caustic scrubbers are susceptible to operational problems not only including inadequate liquid flow (maldistribution, channeling, and flooding), entrainment of the liquid caustic scrubbing solution to downstream unit operations (leading to corrosion, contamination, and unexpected plant down-time for maintenance), poor biogas to liquid contact, and plugging of the scrubber internals. Further liquid caustic scrubbers can exhibit scale deposition from minerals used in the scrubbing solution, and necessitate the need for expensive and cumbersome waste water treatment requirements of spent caustic scrubbing solution such as neutralization of the liquid waste for disposal.

In embodiments, said material (40) comprises a substance configured to neutralize or remove halogen from a source of biogas. In embodiments, said material (40) comprises a base. In embodiments, said material (40) comprises one or more bases selected from the non-limiting group consisting of a hydroxide, calcium hydroxide, sodium hydroxide, calcium oxide, sodium bicarbonate, ammonia, sodium carbonate, sodium hypochlorite, and potassium hydroxide.

In embodiments, said material (40) comprises one or more bases selected from the non-limiting group consisting of aluminum hydroxide, barium hydroxide, barium oxide, calcium carbonate, calcium phosphate, copper (II) hydroxide, iron (II) hydroxide, iron (III) hydroxide, lithium carbonate, lithium hydroxide, magnesium hydroxide, potassium bicarbonate, potassium carbonate, sodium acetate, sodium borate, sodium metasilicate, sodium phosphate, sodium silicate, strontium hydroxide, tetraethylammonium hydroxide, tetramethylammonium hydroxide, tetrapropylammonium hydroxide, zinc hydroxide, and zinc oxide. In embodiments, said material (40) comprises a substance having a pH greater than or equal to 7. In embodiments, said material (40) comprises a substance having a pH comprising a range selected from the group consisting of 7 to 7.25, 7.25 to 7.5, 7.5 to 7.75, 7.75 to 8, 8 to 8.25, 8.25 to 8.5, 8.5 to 8.75, 8.75 to 9, 9 to 9.25, 9.25 to 9.5, 9.5 to 9.75, 9.75 to 10, 10 to 10.25, 10.25 to 10.5, 10.5 to 10.75, 10.75 to 11, 11 to 11.25, 11.25 to 11.5, 11.5 to 11.75, 11.75 to 12, 12 to 12.25, 12.25 to 12.5, 12.5 to 12.75, 12.75 to 13, 13 to 13.25, 13.25 to 13.5, 13.5 to 13.75, and 13.75 to 14. In embodiments, said material (40) comprises a substance having a pH greater than 14.

In embodiments, said material (40) comprises a mixture of water and one or more abovementioned bases. In embodiments, said material (40) comprises a mixture of a solvent and one or more abovementioned bases.

In embodiments, said material (40) comprises a solvent. In embodiments, said material (40) comprises mixture of a solvent and water. In embodiments, said material (40) comprises a neutralizing agent. In embodiments, said neutralizing agent neutralizes the halogen within the source of biogas with a neutral solution. In embodiments, said neutralizing agent comprises an inorganic compound, wherein said inorganic compound reacts with the halogen to neutralize the acid. In embodiments, non-limiting examples of said neutralizing agent include one or more selected from the group consisting of a base, hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, non-limiting examples of said neutralizing agent includes a metal.

In embodiments, said material (40) comprises a pH buffer. In embodiments, said pH buffer includes a zwitterionic buffer. In embodiments, said pH buffer includes a non-zwitterionic buffer. In embodiments, said pH buffer includes a buffer suitable for cell culture. In embodiments, the vessel (10) within the halogen processing system (100) comprises a bioreactor including microorganisms. In embodiments, the microorganisms within the bioreactor produce a substance. In embodiments, the bioreactor processes and/or removes the halogen from the biogas to produce a halogen-depleted gas (55).

In embodiments, the material (40) comprises individual elements comprising cylinders, powder, particulate, granular particles, rings, packing, tablets, and/or pellets. In embodiments, each individual element of the material (40) comprises alumina spheres comprising a diameter. In embodiments, the material (40) comprises spheres comprising a diameter. In embodiments, the material (40) comprises elements comprising a diameter of 1/17 to 1/8 inches. In embodiments, the material (40) comprises elements comprising a diameter of 2/25 to 3/16 inches. In embodiments, the material (40) comprises elements comprising a diameter of comprising one or more selected from the group consisting of 0.01 to 0.1 inch, 0.1 to 0.25 inch, 0.25 to 0.5 inch, 0.5 to 0.75 inch, 0.75 to 1 inch, 1 to 2 inches, 2 to 3 inches, 3 to 4 inches, and 4 to 5 inches. In embodiments, the material (40) comprises a coating. In embodiments, the material (40) comprises a coating upon a substrate. In embodiments, the material (40) comprises a porous material.

In embodiments, the material (40) comprises a surface area in square meters per gram ranging from one or more selected from the group consisting of 2 to 5, 5 to 10, 10 to 20, 20 to 40, 40 to 60, 60 to 80, 80 to 100, 100 to 120, 120 to 140, 140 to 160, 160 to 180, 180 to 200, 200 to 220, 220 to 240, 240 to 260, 260 to 280, 280 to 300, 300 to 400, 400 to 500, 500 to 600, 600 to 700, 700 to 800, 800 to 900, 900 to 1000, 1000 to 1100, 1100 to 1200, 1200 to 1300, 1300 to 1400, 1400 to 1500, 1500 to 1600, 1600 to 1700, 1700 to 1800, 1800 to 1900, 1900 to 2000, 2000 to 2100, 2100 to 2200, 2200 to 2300, 2300 to 2400, 2400 to 2500, 2500 to 2600, 2600 to 2700, 2700 to 2800, 2800 to 2900, 2900 to 3000, 3000 to 3100, 3100 to 3200, 3200 to 3300, 3300 to 3400, 3400 to 3500, 3500 to 3600, 3600 to 3700, 3700 to 3800, 3800 to 3900, 3900 to 4000, 4000 to 4100, 4100 to 4200, 4200 to 4300, 4300 to 4400, 4400 to 4500, 4500 to 4600, 4600 to 4700, 4700 to 4800, 4800 to 4900, and 4900 to 5000 square meters per gram.

In embodiments, the material (40) comprises a crush strength ranging from one or more selected from the group consisting of 0.1 to 1 pound force (lbf), 1 to 10 lbf, 10 to 11 lbf, 11 to 12 lbf, 12 to 13 lbf, 13 to 14 lbf, 14 to 15 lbf, 15 to 16 lbf, 16 to 17 lbf, 17 to 18 lbf, 18 to 19 lbf, 19 to 20 lbf, 20 to 21 lbf, 21 to 22 lbf, 22 to 23 lbf, 23 to 25 lbf, 25 to 30 lbf, 30 to 40 lbf, 40 to 50 lbf, 50 to 60 lbf, 60 to 70 lbf, 70 to 80 lbf, 80 to 90 lbf, 90 to 100 lbf, 100 to 500 lbf, 500 to 1000 lbf, 1000 to 5000 lbf, 5000 to 10000 lbf, 10000 to 15000 lbf, 15000 to 20000 lbf, and 20000 to 25000 lbf.

In embodiments, the material (40) comprises alumina, and comprises one or more alumina weight percent selected from the group consisting of 80 to 82 weight percent, 82 to 84 weight percent, 84 to 86 weight percent, 86 to 88 weight percent, 88 to 90 weight percent, 90 to 92 weight percent, 92 to 94 weight percent, 94 to 96 weight percent, 96 to 98 weight percent, 98 to 99.95 weight percent, and 99.95 to 100 weight percent. In embodiments, the material (40) comprises alumina, wherein said material (40) comprises an adsorbent that comprises 88 to 96 weight percent alumina.

In embodiments, the material (40) comprises alumina, wherein said adsorbent comprises one or more alumina weight percent selected from the group consisting of 0 to 5 weight percent, 5 to 10 weight percent, 10 to 15 weight percent, 15 to 20 weight percent, 20 to 25 weight percent, 25 to 30 weight percent, 30 to 35 weight percent, 35 to 40 weight percent, 40 to 45 weight percent, 45 to 50 weight percent, 50 to 55 weight percent, 55 to 60 weight percent, 60 to 65 weight percent, 65 to 70 weight percent, 70 to 75 weight percent, 75 to 80 weight percent, 80 to 85 weight percent, 85 to 90 weight percent, 90 to 95 weight percent, and 95 to 100 weight percent.

In embodiments, the material (40) comprises a promoted alumina comprising a promoter, wherein said material (40) comprises one or more promoter weight percent selected from the group consisting of 0 to 2 weight percent, 2 to 4 weight percent, 4 to 6 weight percent, 6 to 8 weight percent, 8 to 10 weight percent, 10 to 12 weight percent, 12 to 14 weight percent, 14 to 16 weight percent, 16 to 18 weight percent, 18 to 20 weight percent, 20 to 25 weight percent, 25 to 30 weight percent, 30 to 35 weight percent, 35 to 40 weight percent, 40 to 45 weight percent, 45 to 50 weight percent, 50 to 55 weight percent, 55 to 60 weight percent, 60 to 65 weight percent, 65 to 70 weight percent, 70 to 75 weight percent, 75 to 80 weight percent, 80 to 85 weight percent, 85 to 90 weight percent, 90 to 95 weight percent, and 95 to 100 weight percent.

In embodiments, the promoter within the material (40) comprises a substance that increases the rate at which another substance adheres, interacts, binds, adsorbs, and/or reacts to it. In embodiments, the material (40) comprises an adsorbent, and the promoter within the adsorbent is a substance that increases the rate at which another substance adheres, interacts, binds, adsorbs, and/or reacts to it. In embodiments, the promoter can be used to increase the efficiency of removal, or adsorption, of said acid by increasing the surface area of the material that is in contact with the acid. In embodiments, the promoter within the material (40) comprises a substance that allows for another substance to dissociate, react, combine, adsorb, absorb, deposit, fuse, attract, adhere, cling, bind, unite, join, assimilate, polymerize, and/or catalyze in the presence of the material (40). In embodiments, the promoter within the material (40) comprises a substance that allows for at least a portion of the halogen and/or at least a portion of the halogen-laden gas (50), other than the halogen to dissociate, react, combine, adsorb, absorb, deposit, fuse, attract, adhere, cling, bind, unite, join, assimilate, polymerize, and/or catalyze in the presence of the material (40). In embodiments, the promoter within the material (40) comprises a substance that allows for at least a portion of the halogen and/or at least a portion of the halogen-laden gas (50), other than the halogen to dissociate, react, combine, adsorb, absorb, deposit, fuse, attract, adhere, cling, bind, unite, join, assimilate, polymerize, and/or catalyze in the presence of the material (40), to produce a salt, an acid, a primary compound, and/or a secondary compound, to produce the halogen-depleted gas (55). In embodiments, there are a variety of different promoters that can be used in the material (40), not only including metal promoters which include metal ions or metal compounds that are added to the material (40). For example, some non-limiting types of metal promoters used in the material include one or more promoters selected from the group consisting of chromium, cobalt, copper, iron, molybdenum, nickel, palladium, platinum, tungsten, and vanadium. These metals can be used alone or in combination with each other or with other types of promoters, such as non-metal or organic promoters.

In embodiments, the flow of the product, biogas including the halogenated volatile organic compound, the halogen-laden gas (50) and/or halogen-depleted gas (55), such as for example entering and/or leaving the vessel (10), includes one or more flowrates selected from the group consisting of 1 to 25 standard cubic feet per minute (SCFM), 25 to 100 SCFM, 100 to 500 SCFM, 500 to 1000 SCFM, 1000 to 2000 SCFM, 2000 to 3000 SCFM, 3000 to 4000 SCFM, 4000 to 5000 SCFM, 5000 to 6000 SCFM, 6000 to 7000 SCFM, 7000 to 8000 SCFM, 8000 to 9000 SCFM, 9000 to 10000 SCFM, 10000 to 15000 SCFM, and 15000 to 20000 SCFM.

In embodiments, the material (40) is a non-regenerable material and is changed-out over a time duration, said time duration comprises one or more time durations selected from the group consisting of: 1 day to 1 week, 1 week to 1 month, 1 to 2 months, 2 to 3 months, 3 to 4 months, 4 to 5 months, 5 to 6 months, 6 to 8 months, 8 months to 1 year, 1 to 1.5 years, 1.5 to 2 years, 2 to 2.5 years, 2.5 to 3 years, 3 to 3.5 years, 3.5 to 4 years, 4 to 4.5 years, 4.5 to 5 years, 5 to 6 years, 6 to 7 years, 7 to 8 years, 8 to 9 years, 9 to 10 years, 10 to 15 years, 15 to 20 years, and 20 to 30 years.

In embodiments, the product comprises an energy content in British Thermal Units (BTU) per Standard Cubic Foot (SCF) (BTU/SCF) greater than 800 BTU/SCF. In embodiments, the product comprises an energy content in British Thermal Units (BTU) per Standard Cubic Foot (SCF) (BTU/SCF) ranging from one or more selected from the group consisting of less than 800 BTU/SCF, 800 to 900 BTU/SCF, 900 to 910 BTU/SCF, 910 to 920 BTU/SCF, 920 to 930 BTU/SCF, 930 to 940 BTU/SCF, 940 to 950 BTU/SCF, 950 to 960 BTU/SCF, 960 to 970 BTU/SCF, 970 to 980 BTU/SCF, 980 to 990 BTU/SCF, 990 to 1000 BTU/SCF, 1000 to 1010 BTU/SCF, 1010 to 1020 BTU/SCF, 1020 to 1030 BTU/SCF, 1030 to 1040 BTU/SCF, 1040 to 1050 BTU/SCF, 1050 to 1060 BTU/SCF, 1060 to 1070 BTU/SCF, 1070 to 1080 BTU/SCF, 1080 to 1090 BTU/SCF, and 1090 to 1100 BTU/SCF. In embodiments, the product comprises an energy content in British Thermal Units (BTU) per Standard Cubic Foot (SCF) (BTU/SCF) greater than 1100 BTU/SCF.

In embodiments, the product comprises an energy content in British Thermal Units (BTU) per Standard Cubic Foot (SCF) (BTU/SCF) ranging from 800 to 1500 BTU/SCF.

In embodiments, the product comprises a methane content ranging from one or more selected from the group consisting of less than 30 percent, 30 to 35 percent, 35 to 45 percent, 45 to 55 percent, 55 to 65 percent, 65 to 75 percent, 75 to 80 percent, 80 to 90 percent, 90 to 95 percent, 95 to 96 percent, 96 to 97 percent, 97 to 98 percent, 98 to 99 percent, and 99 to 100 percent, by volume. In embodiments, the product comprises a methane content ranging from 93 to 99 percent, by volume.

In embodiments, the product comprises a hydrocarbon content ranging from one or more selected from the group consisting of 0 to 0.050 percent, 0.050 to 0.075 percent, 0.075 to 0.113 percent, 0.113 to 0.169 percent, 0.169 to 0.253 percent, 0.253 to 0.380 percent, 0.380 to 0.570 percent, 0.570 to 0.854 percent, 0.854 to 1.281 percent, 1.281 to 5 percent, and greater than 5 percent, by volume. In embodiments, the hydrocarbon comprises propane, butane, isobutane, methane, a hydrocarbon gas comprising less than three carbon atoms, a hydrocarbon gas comprising three carbon atoms, and/or a hydrocarbon gas comprising greater than three carbon atoms. In embodiments, the product comprises a hydrocarbon content greater than 0. In embodiments, the product comprises a hydrocarbon content greater than or equal to 0. In embodiments, the product comprises a hydrocarbon content ranging from 0.050 to 1.281 percent, by volume. In embodiments, the propane is mixed with the product to tailor the energy content of the product to a predetermined energy content.

In embodiments, the product comprises a carbon dioxide content ranging from one or more selected from the group consisting of greater than 0 and less than or equal to 0.100, 0.100 to 0.120 percent, 0.120 to 0.144 percent, 0.144 to 0.173 percent, 0.173 to 0.207 percent, 0.207 to 0.249 percent, 0.249 to 0.299 percent, 0.299 to 0.358 percent, 0.358 to 0.430 percent, 0.430 to 0.516 percent, 0.516 to 0.619 percent, 0.619 to 0.743 percent, 0.743 to 0.892 percent, 0.892 to 1.070 percent, 1.070 to 1.284 percent, 1.284 to 1.541 percent, 1.541 to 1.849 percent, 1.849 to 2.219 percent, 2.219 to 2.662 percent, 2.662 to 3.195 percent, 3.195 to 3.834 percent, 3.834 to 4.601 percent, 4.601 to 5 percent, and greater than 5 percent, by volume. In embodiments, the product comprises a carbon dioxide content ranging from 0 to 5 percent, by volume. In embodiments, the product comprises a carbon dioxide content less than 1 percent, by volume. In embodiments, the product comprises a carbon dioxide content less than 5 percent, by volume. In embodiments, the product comprises a carbon dioxide content less than 100 parts per million, by volume. In embodiments, the product comprises a carbon dioxide content less than 500 parts per million, by volume.

In embodiments, the product comprises a nitrogen content ranging from one or more selected from the group consisting of greater than 0 and less than or equal to 0.100, 0.100 to 0.120 percent, 0.120 to 0.144 percent, 0.144 to 0.173 percent, 0.173 to 0.207 percent, 0.207 to 0.249 percent, 0.249 to 0.299 percent, 0.299 to 0.358 percent, 0.358 to 0.430 percent, 0.430 to 0.516 percent, 0.516 to 0.619 percent, 0.619 to 0.743 percent, 0.743 to 0.892 percent, 0.892 to 1.070 percent, 1.070 to 1.284 percent, 1.284 to 1.541 percent, 1.541 to 1.849 percent, 1.849 to 2.219 percent, 2.219 to 2.662 percent, 2.662 to 3.195 percent, 3.195 to 3.834 percent, 3.834 to 4.601 percent, 4.601 to 5 percent, and greater than 5 percent, by volume. In embodiments, the product comprises a nitrogen content less than 1 percent, by volume. In embodiments, the product comprises a nitrogen content less than 5 percent, by volume. In embodiments, the product comprises a nitrogen content less than 100 parts per million, by volume. In embodiments, the product comprises a nitrogen content less than 500 parts per million, by volume.

In embodiments, the product comprises a oxygen content ranging from one or more selected from the group consisting of greater than 0 and less than or equal to 0.100, 0.100 to 0.120 percent, 0.120 to 0.144 percent, 0.144 to 0.173 percent, 0.173 to 0.207 percent, 0.207 to 0.249 percent, 0.249 to 0.299 percent, 0.299 to 0.358 percent, 0.358 to 0.430 percent, 0.430 to 0.516 percent, 0.516 to 0.619 percent, 0.619 to 0.743 percent, 0.743 to 0.892 percent, 0.892 to 1.070 percent, 1.070 to 1.284 percent, 1.284 to 1.541 percent, 1.541 to 1.849 percent, 1.849 to 2.219 percent, 2.219 to 2.662 percent, 2.662 to 3.195 percent, 3.195 to 3.834 percent, 3.834 to 4.601 percent, 4.601 to 5 percent, and greater than 5 percent, by volume. In embodiments, the product comprises an oxygen content less than 1 percent, by volume. In embodiments, the product comprises an oxygen content less than 5 percent, by volume. In embodiments, the product comprises an oxygen content less than 100 parts per million, by volume. In embodiments, the product comprises an oxygen content less than 500 parts per million, by volume.

In embodiments, the material (40) is a non-regenerable material and instead is used in a single-use application and is not intended nor designed to be regenerated. In embodiments, the material (40) comprises a regenerable material. In embodiments, the material (40) comprises an adsorbent and includes a regenerable adsorbent which may be regenerated by removing the halogen that has been adsorbed onto the surface or into pores of the adsorbent. In embodiments, the material (40) comprises a material and includes a regenerable material which may be regenerated by removing the halogen away from the material. This can be done through a variety of methods, including pressure swing desorption, temperature swing desorption, heating, washing, pulling a vacuum, and/or exposure to a chemical and/or a mixture of chemicals. In embodiments, the material (40) includes a regenerable adsorbent comprising alumina that can be regenerated by thermal regeneration, chemical regeneration, and/or physical regeneration. In embodiments, the material (40) comprises a regenerable material. In embodiments, the material (40) comprises a regenerable material which may be regenerated by removing the halogen that was dissociates, reacts, combines, adsorbs, absorbs, deposits, fuses, attracts, adheres, clings, binds, unites, joins, assimilates, converts, polymerizes, and/or catalyzes, with, onto, into, in response to, within, with the assistance of, and/or on a surface of at least a portion of said material (40).

In embodiments, the material (40) processes and/or removes the halogen from the halogen-laden gas (50) to produce the halogen-depleted gas (55), wherein the halogen-depleted gas (55) comprises a halogen content ranging from one or more ranges selected from the group consisting of 0 to 0.0001 parts per million (ppm), 0.0001 to 0.001 ppm, 0.001 to 0.005 ppm, 0.005 to 0.025 ppm, 0.025 to 0.125 ppm, 0.125 to 0.25 ppm, 0.25 to 0.5 ppm, 0.5 to 0.75 ppm, 0.75 to 1 ppm, 1 to 1.25 ppm, 1.25 to 1.5 ppm, 1.5 to 1.75 ppm, 1.75 to 2 ppm, 2 to 2.25 ppm, 2.25 to 2.5 ppm, 2.5 to 2.75 ppm, 2.75 to 3 ppm, 3 to 3.25 ppm, 3.25 to 3.5 ppm, 3.5 to 3.75 ppm, 3.75 to 4 ppm, 4 to 4.25 ppm, 4.25 to 4.5 ppm, 4.5 to 4.75 ppm, 4.75 to 5 ppm, 5 to 5.5 ppm, 5.5 to 6 ppm, 6 to 6.5 ppm, 6.5 to 7 ppm, 7 to 7.5 ppm, 7.5 to 8 ppm, 8 to 8.5 ppm, 8.5 to 9 ppm, 9 to 9.5 ppm, 9.5 to 10 ppm, 10 to 15 ppm, 15 to 20 ppm, 20 to 25 ppm, 25 to 30 ppm, 30 to 35 ppm, 35 to 40 ppm, 40 to 45 ppm, 45 to 50 ppm, 50 to 75 ppm, 75 to 100 ppm, 100 to 125 ppm, 125 to 150 ppm, 150 to 175 ppm, 175 to 200 ppm, 200 to 250 ppm, 250 to 300 ppm, 300 to 350 ppm, 350 to 400 ppm, 400 to 450 ppm, 450 to 500 ppm, 500 ppm to 1000 ppm, 1000 ppm to 2000 ppm, 2000 to 5000 ppm, 5000 ppm to 10000 ppm, 10000 to 20000 ppm, and 20000 ppm to 200000 ppm.

In embodiments, product comprises a reduced amount of halogenated volatile organic compounds. In embodiments, product halogenated volatile organic compound content ranging from one or more ranges selected from the group consisting of 0 to 0.0001 parts per million (ppm), 0.0001 to 0.001 ppm, 0.001 to 0.005 ppm, 0.005 to 0.025 ppm, 0.025 to 0.125 ppm, 0.125 to 0.25 ppm, 0.25 to 0.5 ppm, 0.5 to 0.75 ppm, 0.75 to 1 ppm, 1 to 1.25 ppm, 1.25 to 1.5 ppm, 1.5 to 1.75 ppm, 1.75 to 2 ppm, 2 to 2.25 ppm, 2.25 to 2.5 ppm, 2.5 to 2.75 ppm, 2.75 to 3 ppm, 3 to 3.25 ppm, 3.25 to 3.5 ppm, 3.5 to 3.75 ppm, 3.75 to 4 ppm, 4 to 4.25 ppm, 4.25 to 4.5 ppm, 4.5 to 4.75 ppm, 4.75 to 5 ppm, 5 to 5.5 ppm, 5.5 to 6 ppm, 6 to 6.5 ppm, 6.5 to 7 ppm, 7 to 7.5 ppm, 7.5 to 8 ppm, 8 to 8.5 ppm, 8.5 to 9 ppm, 9 to 9.5 ppm, 9.5 to 10 ppm, 10 to 15 ppm, 15 to 20 ppm, 20 to 25 ppm, 25 to 30 ppm, 30 to 35 ppm, 35 to 40 ppm, 40 to 45 ppm, 45 to 50 ppm, 50 to 75 ppm, 75 to 100 ppm, 100 to 125 ppm, 125 to 150 ppm, 150 to 175 ppm, 175 to 200 ppm, 200 to 250 ppm, 250 to 300 ppm, 300 to 350 ppm, 350 to 400 ppm, 400 to 450 ppm, 450 to 500 ppm, 500 ppm to 1000 ppm, 1000 ppm to 2000 ppm, 2000 to 5000 ppm, 5000 ppm to 10000 ppm, and 10000 ppm to 100000 ppm.

In embodiments, product comprises a reduced amount of halogenated volatile organic compounds. In embodiments, product halogenated volatile organic compound content ranging from one or more selected from the group consisting of less than 1 part per billion (ppb), less than 10 ppb, less than 20 ppb, less than 30 ppb, less than 40 ppb, less than 50 ppb, less than 100 ppb, less than 200 ppb, less than 300 ppb, less than 400 ppb, less than 500 ppb, less than 750 ppb, less than 1000 ppb, less than 10000 ppb, less than 20000 ppb, and less than 200000 ppb.

In embodiments, the material (40) processes and/or removes said halogen from the halogen-laden gas (50) to produce the halogen-depleted gas (55), wherein the halogen-depleted gas (55) comprises a halogen content of 0 parts per billion (ppb).

In embodiments, the material (40) processes and/or removes said halogen from the halogen-laden gas (50) to produce the halogen-depleted gas (55), wherein the halogen-depleted gas (55) comprises a halogen content ranging from one or more ranges selected from the group consisting of 0 to 5 parts per billion (ppb), 5 to 10 ppb, 10 to 15 ppb, 15 to 20 ppb, 20 to 25 ppb, 25 to 30 ppb, 30 to 35 ppb, 35 to 40 ppb, 40 to 45 ppb, 45 to 50 ppb, 50 to 60 ppb, 60 to 70 ppb, 70 to 80 ppb, 80 to 90 ppb, 90 to 100 ppb, 100 to 200 ppb, 200 to 300 ppb, 300 to 400 ppb, 400 to 500 ppb, 500 to 600 ppb, 600 to 700 ppb, 700 to 800 ppb, 800 to 900 ppb, 900 to 1000 ppb, 1000 to 2000 ppb, 2000 to 3000 ppb, 3000 to 4000 ppb, 4000 to 5000 ppb, 5000 to 10000 ppb, 10000 to 20000 ppb, 20000 to 40000 ppb, 40000 to 80000 ppb, and 80000 to 100000 ppb.

In embodiments, the halogen-laden gas (50) comprises a halogen content ranging from one or more ranges selected from the group consisting of 0.0005 to 0.05 parts per million (ppm), 0.05 to 1 ppm, 1 to 4 ppm, 4 to 5 ppm, 5 to 10 ppm, 10 to 15 ppm, 15 to 20 ppm, 20 to 25 ppm, 25 to 30 ppm, 30 to 35 ppm, 35 to 40 ppm, 40 to 45 ppm, 45 to 50 ppm, 50 to 60 ppm, 60 to 70 ppm, 70 to 80 ppm, 80 to 90 ppm, 90 to 100 ppm, 100 to 200 ppm, 200 to 300 ppm, 300 to 400 ppm, 400 to 500 ppm, 500 to 1000 ppm, 1000 to 2500 ppm, 2500 to 5000 ppm, 5000 to 10000 ppm, 10000 to 50000 ppm, and 50000 to 100000 ppm.

In embodiments, halogen-depleted gas (55) comprises a reduced amount of halogenated volatile organic compounds, wherein the halogen-depleted gas (55) comprises a halogenated volatile organic compound content ranging from one or more ranges selected from the group consisting of 0 to 5 parts per billion (ppb), 5 to 10 ppb, 10 to 15 ppb, 15 to 20 ppb, 20 to 25 ppb, 25 to 30 ppb, 30 to 35 ppb, 35 to 40 ppb, 40 to 45 ppb, 45 to 50 ppb, 50 to 60 ppb, 60 to 70 ppb, 70 to 80 ppb, 80 to 90 ppb, 90 to 100 ppb, 100 to 200 ppb, 200 to 300 ppb, 300 to 400 ppb, 400 to 500 ppb, 500 to 600 ppb, 600 to 700 ppb, 700 to 800 ppb, 800 to 900 ppb, and 900 to 1000 ppb.

In embodiments, halogen-depleted gas (55) comprises a halogenated volatile organic compound content ranging from one or more ranges selected from the group consisting of 0.0005 to 0.05 parts per million (ppm), 0.05 to 1 ppm, 1 to 4 ppm, 4 to 5 ppm, 5 to 10 ppm, 10 to 15 ppm, 15 to 20 ppm, 20 to 25 ppm, 25 to 30 ppm, 30 to 35 ppm, 35 to 40 ppm, 40 to 45 ppm, 45 to 50 ppm, 50 to 60 ppm, 60 to 70 ppm, 70 to 80 ppm, 80 to 90 ppm, 90 to 100 ppm, 100 to 200 ppm, 200 to 300 ppm, 300 to 400 ppm, 400 to 500 ppm, 500 to 1000 ppm, 1000 to 2500 ppm, 2500 to 5000 ppm, 5000 to 10000 ppm, 10000 to 50000 ppm, and 50000 to 100000 ppm.

In embodiments, FIG. 1 describes a non-limiting method to produce a halogen-depleted biogas, comprising:
providing a source of biogas, said biogas comprises methane and a halogen;
providing a halogen processing system comprising an adsorbent, said halogen processing system is configured to accept said source of biogas and contact said source of biogas with said adsorbent to remove at least a portion of said halogen within said source of biogas to produce said halogen-depleted biogas, said halogen-depleted biogas comprises a reduced amount of said halogen relative to said source of biogas; and
supplying said source of biogas to said halogen processing system, and within said halogen processing system contacting said source of biogas with said adsorbent to adsorb said at least a portion of said halogen from said source of biogas to produce said halogen-depleted biogas, wherein said halogen-depleted biogas comprises a reduced amount of said halogen relative to said source of biogas.

In embodiments, FIG. 1 describes a non-limiting method to produce a halogen-depleted biogas, comprising:
providing a gas derived from and/or including a source of biogas, said gas derived from and/or including said biogas comprises a halogen;
providing a halogen processing system comprising a material, said halogen processing system accepts said gas derived from and/or including said source of biogas and contacts said gas with said material within said halogen processing system to remove at least a portion of said halogen within said source of gas to produce said halogen-depleted biogas, said halogen-depleted biogas comprises a reduced amount of said halogen relative to said source of gas; and
supplying said source of gas to said halogen processing system, and within said halogen processing system contacting said source of gas with said material to remove said at least a portion of said halogen from said source of gas to produce said halogen-depleted biogas, wherein said halogen-depleted biogas comprises a reduced amount of said halogen relative to said source of gas.

In embodiments, said gas (50) or said halogen-laden gas (50) is derived from gases produced by the biological breakdown of organic matter. In embodiments, said gas derived from and/or including a gas (50) or said halogen-laden gas (50) for example may be derived from one or more sources of organic matter selected from the group consisting of carbonaceous material, biomass, compost, municipal solid waste, refuse derived fuel, garbage, plant matter, sewage, sewage sludge, waste water treatment facility products, industrial waste, industrial waste by-product, energy crops, vinasse, food waste, human excrement, animal manure, pig manure, chicken manure, cow manure, horse manure, bird manure, cattle manure, insect manure, humans, animals, pigs, chickens, cows, horses, birds, and insects.

In embodiments, said gas (50) or said halogen-laden gas (50) is produced in, derived from, includes, and/or is collected from an anerobic digester, an anerobic digestion process, and/or a bioreactor. For example, in an anerobic digester and/or an anaerobic digestion process, biogas is produced through the process of anaerobic digestion.

In embodiments, said gas (50) or said halogen-laden gas (50) is produced in, derived from, includes, and/or is collected from a landfill and/or a plurality of landfills.

In embodiments, said gas (50) or said halogen-laden gas (50) is produced, derived from, includes, and/or is collected from waste water treatment facility and/or a plurality of waste water treatment facilities.

In embodiments, said gas (50) or said halogen-laden gas (50) is produced in, derived from, includes, and/or is collected from a bioreactor and/or a plurality of bioreactors.

In embodiments, the halogen removal process from biogas can be used to produce renewable energy products including products and processes that mitigate climate change by capturing of greenhouse gases such as methane (and carbon dioxide, and nitrogen) to make useful products. In embodiments, the halogen removal process from biogas can be used to produce renewable energy products including products and processes that mitigate climate change by employing technologies for the production of fuel of non-fossil origin not only including hydrogen, a biofuel, a synthetic alcohol, a synthetic liquid fuel, a synthetic chemical, a hydrocarbon, renewable natural gas, renewable electricity, renewable power, renewable energy. In embodiments, the halogen removal process from biogas can be used to produce renewable chemical products including products and processes that mitigate climate change by use of renewable energy sources, improving process efficiency by removing a halogen to prevent corrosion of important capital assets within associated systems. In embodiments, the halogen removal process from biogas can be used to produce renewable energy products including products and processes that mitigate climate change by employing advancements in technologies relating to agriculture and livestock or agroalimentary industries by using waste plant matter and/or waste manure from livestock operations to produce new and useful products. In embodiments, the halogen removal process from biogas can be used to produce renewable energy products including products and processes that mitigate climate change by enabling technologies with a potential contribution to greenhouse gas emissions mitigation such as fuel cell and hydrogen production processes. In embodiments, the halogen removal process from biogas can be used to produce renewable energy products including products and processes that mitigate climate change by employing landfill technologies aiming to mitigate methane emissions by processing biogas from the landfill instead of allowing the methane and other gases within the biogas to permeate from the landfill surface.

FIG. 2

Figure 2:
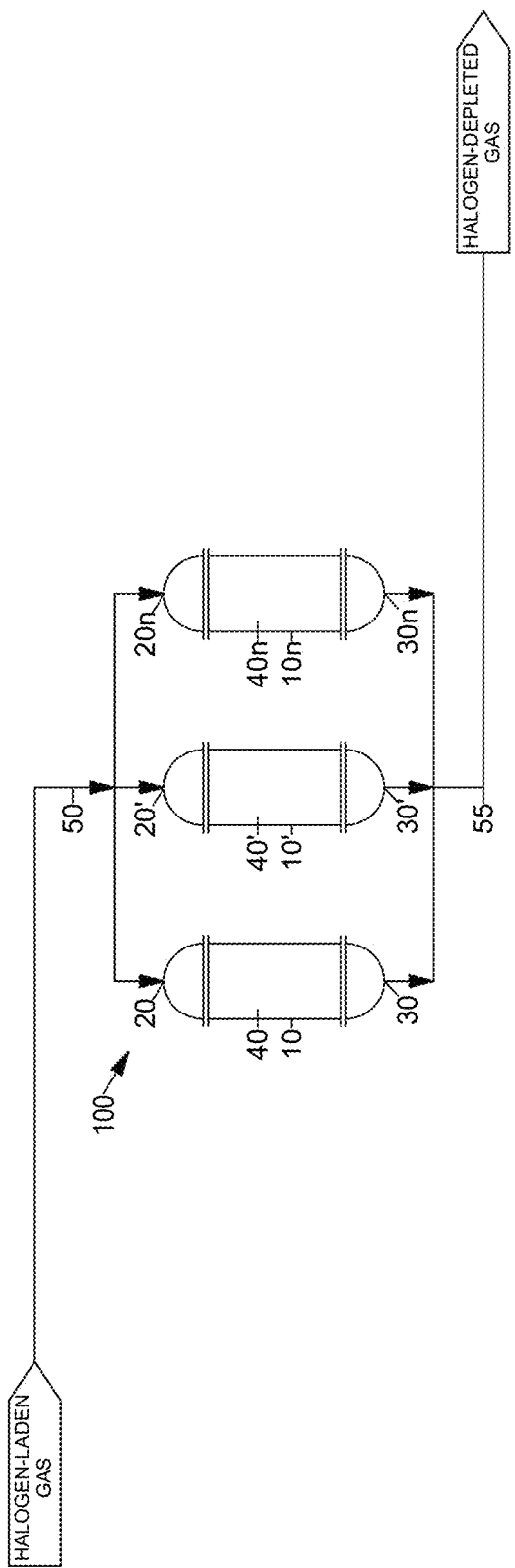
FIG. 2 depicts another non-limiting embodiment of a halogen processing system (100) for use in removing a halogen from a gas derived from and/or including a source of biogas.

FIG. 2 depicts another non-limiting embodiment of a halogen processing system (100) for use in removing halogen from a gas derived from and/or including a source of biogas.

FIG. 2 shows a plurality of vessels (10, 10') as depicted in FIG. 1, however shown in parallel. In embodiments, each of the plurality of vessels (10, 10', 10n) shown in within the halogen processing system (100) of FIG. 2 has an inlet (20, 20', 20n) and an outlet (30, 30', 30n) and configured to receive the halogen-laden gas (50), remove halogen therefrom and produce the halogen-depleted gas (55).

FIG. 2 shows a plurality of vessels (10, 10', 10n) connected in parallel where both or one of the plurality of vessels (10, 10') receive at least a portion of the biogas or the halogen-laden gas (50). In embodiments, as shown in FIG. 2. at least one of the plurality of vessels (10, 10', 10n) receives a portion of the halogen-laden gas (50) to produce a halogen-depleted gas (55) that comes from a plurality of vessels (10, 10', 10n).

In embodiments, as shown in FIG. 2. at least one of the plurality of vessels (10, 10', 10n) receives at least a portion of the halogen-laden gas (50), while at least one of the plurality of vessels (10, 10', 10n) is in standby-mode awaiting subsequent use at a later time. Although three vessels (10, 10', 10n) are shown in FIG. 2, it is to be understood that two, three, four, five, six, or more vessels (10, 10', 10n) may be provided.

In embodiments, the plurality of vessels (10, 10', 10n) connected in parallel as depicted in FIG. 2 to increase the overall capacity of the system. When the vessels (10, 10', 10n) are connected in parallel, they operate simultaneously and share the load equally. This allows the system to treat a larger volume of a biogas and/or a biogas-derived gas in a given period of time, and thus remove more halogen from the halogen-laden gas (50).

In embodiments, the plurality of vessels (10, 10', 10n) include a first vessel (10), second vessel (10'), and a third vessel (10n). In embodiments, the first vessel (10) includes a first material (40). In embodiments, the second vessel (10') includes a second material (40'). In embodiments, the third vessel (10n) includes a third material (40n). In embodiments, the first material (40), the second material (40'), and third material (40n) comprise the same type of material (40).

In embodiments, the plurality of vessels (10, 10', 10n) connected in parallel as depicted in FIG. 2 offers greater flexibility in that parallel vessels can be easily adjusted to meet changing treatment needs, allowing the system to be easily scaled up or down as needed. Reduced maintenance costs also plays a role in utilizing the halogen processing system (100) of FIG. 2, for example, the parallel vessels (10, 10', 10n) can extend the life of each individual vessel (10, 10', 10n), as they can operate at a lower flow rate and be regenerated more frequently which can help to reduce the overall cost of the system.

FIG. 3

Figure 3:
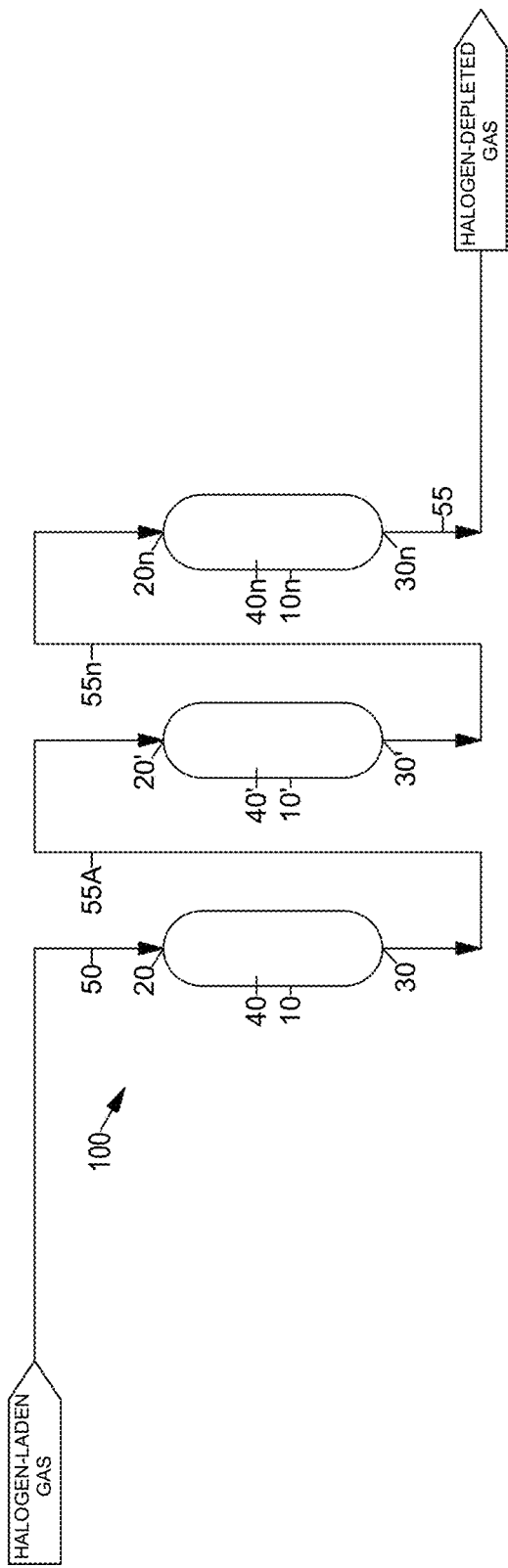
FIG. 3 depicts another non-limiting embodiment of a halogen processing system (100) for use in removing a halogen from a gas derived from and/or including a source of biogas.

FIG. 3 depicts another non-limiting embodiment of a halogen processing system (100) for use in removing halogen from a biogas and/or a biogas-derived gas. FIG. 3 shows a plurality of vessels (10, 10', 10n) as depicted in FIG. 1, however shown in series. In embodiments, each of the plurality of vessels (10, 10', 10n) shown in within the halogen processing system (100) of FIG. 3 has an inlet (20, 20', 20n) and an outlet (30, 30', 30n).

In embodiments, the plurality of vessels (10, 10', 10n) include a first vessel (10), second vessel (10'), and a third vessel (10n). In embodiments, the first vessel (10) includes a first material (40). In embodiments, the second vessel (10') includes a second material (40'). In embodiments, the third vessel (10n) includes a third material (40n). In embodiments, the first material (40), the second material (40'), and third material (40n) comprise the same type of material (40).

FIG. 3 shows the outlet (30) of a first vessel (10) in fluid communication with the inlet (20') of the second vessel (10'), and the outlet (30') of a second vessel (10') in fluid communication with the inlet (20n) of a third vessel (10n). This allows for the halogen-laden gas (50) to first pass through the first vessel (10) to produce a first intermediate halogen-depleted gas (55A), and the first intermediate halogen-depleted gas (55A) is then supplied to the second vessel (10') to further remove (or polish) halogen therefrom and produce a second intermediate halogen-depleted gas (55n). The second intermediate halogen-depleted gas (55n) is then supplied to the third vessel (10n) to further remove (or polish) halogen therefrom and produce the halogen-depleted gas (55). Although three vessels (10, 10', 10n) are shown in FIG. 3, it is to be understood that two, three, four, five, six, or more vessels (10, 10', 10n) may be provided.

The halogen-laden gas (50) comprises at least methane and a halogen. The first intermediate halogen-depleted gas (55A) comprises a reduced amount of halogen relative to the halogen-laden gas (50). The second intermediate halogen-depleted gas (55n) comprises a reduced amount of halogen relative to both the halogen-laden gas (50) and the first intermediate halogen-depleted gas (55A). The halogen-depleted gas (55) comprises a reduced amount of halogen relative to the first and second intermediate halogen-depleted gas (55A, 55n).

The halogen processing system (100) as shown in FIG. 3 depicts a lead-lag vessel configuration where the first vessel (10) receives the halogen-laden gas (50) to remove halogen therefrom and produce a first intermediate halogen-depleted gas (55A), a second vessel (10') receives the first intermediate halogen-depleted gas (55A) and processes and/or removes halogen therefrom to produce a second intermediate halogen-depleted gas (55n), and a third vessel (10n) receives the second intermediate halogen-depleted gas (55n) and processes and/or removes halogen therefrom to produce a halogen-depleted gas (55). In embodiments, this lead-lag vessel arrangement as shown in FIG. 3 is used to remove halogen from a biogas and/or a biogas-derived gas. FIG. 3 shows three vessels (10, 10', 10n) that are connected in series, with the first vessel (10) operating in the "lead" position and the second and third vessels (10', 10n) operating in the "lag" position.

In embodiments, after a duration of time operating where the first vessel (10) receives the halogen-laden gas (50), the second vessel (10') receives the first intermediate halogen-depleted gas (55A), and the third vessel (10n) receives the second intermediate halogen-depleted gas (55n), the first, second, and/or third vessels can be switched, wherein the first vessel (10') which was the "lead" vessel may be switched to the "lag" vessel, and similarly the second vessel (10') and third vessel (10n) which had been operating as the "lag" vessel can be changed to the "lead" vessel. By switching the "lead" vessel to the "lag" vessel, the halogen processing system (100) can realize improved efficiency, reduced downtime, greater flexibility, and reduced maintenance costs.

In embodiments: the first vessel (10) is lead, second vessel (10') is first lag, third vessel (10n) is second lag; the second vessel (10') is lead, third vessel (10n) is first lag, first vessel (10) is second lag; the third vessel (10n) is lead, first vessel (10) is first lag, second vessel (10') is second lag.

In embodiments: the first vessel (10) is lead, second vessel (10') is first lag, third vessel (10n) is second lag; the third vessel (10n) is lead, first vessel (10) is first lag, second vessel (10') is second lag; the second vessel (10') is lead, third vessel (10n) is first lag, first vessel (10) is second lag.

In embodiments, there are certain benefits to installing the halogen processing system (100) in the configuration of FIG. 3. Use of a plurality of vessels (10, 10', 10n, 10n1, 10n2, 10n3) in series, a lead-lag vessel arrangement can effectively remove a greater amount of halogen from the biogas. This can improve the overall efficiency of the treatment process. Lead-lag vessels (10, 10', 10n) as shown in FIG. 3 allow one vessel to continue operating while the other is being regenerated or replaced with fresh material (40). This can help to reduce downtime and improve the overall reliability of the system. Lead-lag vessels (10, 10', 10n) as shown in FIG. 3 can be easily adjusted to meet changing treatment needs (e.g. variations in halogen levels of the biogas entering the halogen processing system (100), variations in flow rates or impurity levels). By using a plurality of vessels (10, 10', 10n) in series, a lead-lag vessel can effectively extend the life of material (40) in each vessel (10, 10', 10n), reducing the need for frequent maintenance and replacement. In embodiments the material (40) within each of the vessels (10, 10', 10n) is identical. In embodiments, the material (40) within each of the vessels (10, 10', 10n) is different. This can help to reduce the overall cost of the system. In embodiments, the lead-lag configuration as shown in FIG. 3 allows for a downstream second vessel (10') and/or third vessel (10n) to polish the first intermediate halogen-depleted gas (55A) and/or the second intermediate halogen-depleted gas (55n). In embodiments, the second vessel (10') and third vessel (10n) both act as a polishing step, and serve as the final halogen removal step in the halogen processing system (100). Although three vessels are shown in FIG. 3, only two can be utilized, or more can be arranged in series (e.g. four, five, six, or more).

FIG. 4

Figure 4:
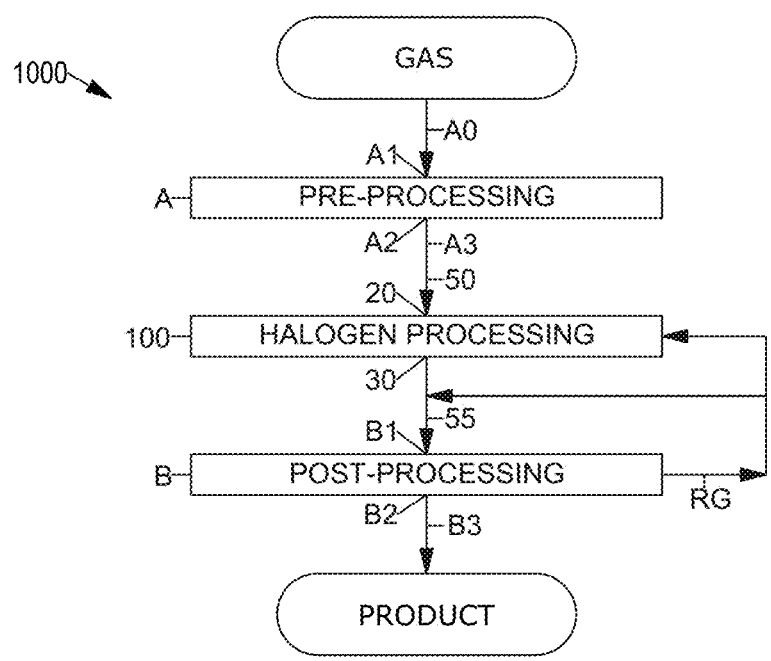
FIG. 4 depicts a non-limiting embodiment of a halogen processing system (100) integrated within a product production system (1000) for producing a product from a halogen-depleted biogas that has undergone both pre-processing and/or post-processing.

FIG. 4 depicts a non-limiting embodiment of a halogen processing system (100) integrated within a product production system (1000) for producing a product from a halogen-depleted biogas that has undergone both pre-processing and/or post-processing.

FIG. 4 shows a product production system (1000) configured to produce a product (B3) from a source of biogas and/or a gas derived from said source of biogas (A0). In embodiments, the product production system (1000) of FIG. 4 comprises a pre-processing system (A), a halogen processing system (100), and a post-processing system (B). In embodiments, the product production system (1000) of FIG. 4 comprises:

a pre-processing system (A) configured to accept said source of biogas and/or said gas derived from said source of biogas (A0) through inlet (A1) and process said biogas and/or said gas derived from said source of biogas (A0) within said pre-processing system (A) to produce a pre-processed gas (A3), said pre-processed gas (A3) is evacuated from said pre-processing system (A) through outlet (A2) and supplied to a halogen processing system (100);

said halogen processing system (100) at inlet (20) accepts said pre-processed gas (A3) from said pre-processing system (A), said halogen processing system (100) processes and/or removes said halogen from said pre-processed gas (A3) to produce a halogen-depleted gas (55), said halogen-depleted gas (55) is evacuated from outlet (30) of said halogen processing system (100) and supplied to a post-processing system (B), wherein said halogen-depleted gas (55) comprises a reduced amount of said halogen relative to said pre-processed gas (A3); and said post-processing system (B) accepts said halogen-depleted gas (55) from said halogen processing system (100) through inlet (B1) and processes said halogen-depleted gas (55) within said post-processing system (B) to produce said product (B3), which is evacuated from said post-processing system (B) through outlet (B2).

In embodiments, said product (B3) comprises a one or more products selected from the group consisting of post-processed biogas, renewable natural gas, a chemical, dimethyl ether, ethanol, Fischer-Tropsch product, hydrogen, methanol, mixed alcohols, an alcohol, 1-butanol, 2-butanol, jet fuel, gasoline, a hydrocarbon, a non-halogenated hydrocarbon, diesel, a lipid, an emulsion, a liquid fuel, and power. In embodiments, the halogen processing system (100) comprises a material (40) wherein said material comprises one or more materials selected from the group consisting of activated alumina, activated carbon, adsorbent, alumina, carbon, carbon nanotubes, a metal, catalyst, ceramic material, caustic, chitosan, chitin, clay, a dry scrubbing agent, an engineered reactant, iron sponge, an ion-exchange resin, molecular sieve, polymeric adsorbent, promoted alumina, reactant, a scavenger, silica gel, and a zeolite.

In embodiments, the halogen processing system (100) comprises a material (40) and within said halogen processing system (100), contacting said pre-processed gas (A3) or said halogen-laden gas (50), with said material (40) to remove halogen from said pre-processed gas (A3), or said halogen-laden gas (50), to remove at least a portion of said halogen within said pre-processed gas (A3), or said halogen-laden gas (50), to produce said halogen-depleted gas (55), wherein said halogen-depleted gas (55) comprises a reduced amount of said halogen relative to said pre-processed gas (A3) or said halogen-laden gas (50).

In embodiments, the pre-processing system (A) processes said biogas and/or said gas derived from said source of biogas (A0) to produce a pre-processed gas (A3), or a halogen-laden gas (50), by one or more processes systems selected from the group consisting of water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, the post-processing system (B) processes said halogen-depleted gas (55) to produce a product (B3) by one or more processes systems selected from the group consisting of water removal process, pre-pressurization with at least one blower, a hydrogen sulfide removal process, a siloxane removal process, chilling, pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

In embodiments, the post-processing system (B) processes said halogen-depleted gas (55) to produce a product (B3) and a recycle gas (RG), wherein at least a portion of the recycle gas (RG) is recycled and supplied to the halogen processing system (100) and/or supplied to be mixed with the halogen-depleted gas (55).

In embodiments, the biogas is derived from and/or produced within a bioreactor that includes microorganisms that produce a substance. In embodiments, the microorganisms within the bioreactor produce one or more substances, selected from the group consisting of a chemical, a lipid, a hydrocarbon, a non-halogenated hydrocarbon, a surfactant, an alcohol, ethanol, 1-butanol, and 2-butanol, and/or mixture of two or more substances, within the bioreactor.

In embodiments, the chemical produced in the bioreactor includes one or more selected from the group consisting of: 3-hydroxypropionate; mevalonate; mevalonic acid; isoprene; aromatics; benzoate (p-hydroxyl, 2-amino, dihydroxy); salicylate; 1-propanol; 1,2-propanediol; (R)-1,2-propanediol; (S)-1,2-propanediol; mixed isomers of 1,2-propanediol; acetoin; methyl ethyl ketone; branched-chain amino acids; valine, leucine, isoleucine; succinate; lactate; 2,3-butanediol; (R,R)-2,3-butanediol; meso-2,3-butanediol; mixed isomers of 2,3-butanediol; citramalate; 1,3-butanediol; (R)-1,3-butanediol; (S)-1,3-butanediol; mixed isomers of 1,3-butanediol; 3-hydroxybutyrate; (R)-3-hydroxybutyrate; (S)-3-hydroxybutyrate; mixed isomers of 3-hydroxybutyrate; butyrate; acetone; isopropanol; acetate; 1,3-butadiene; biopolymers; isobutene; and long chain alcohols.

In embodiments, the substance produced in the bioreactor. In embodiments, the substance produced in the bioreactor is then distilled. In embodiments, the substance produced in the bioreactor is then removed using a membrane. In embodiments, the substance produced in the bioreactor is then dehydrated using pressure swing adsorption. In embodiments, the substance produced in the bioreactor is then dehydrated using an adsorbent. In embodiments, the substance produced in the bioreactor is then dehydrated using molecular sieves. In embodiments, the substance produced in the bioreactor is then dehydrated using a molecular sieve having a pore size less than 50 angstroms.

In embodiments, when ethanol is produced in the bioreactor, it is then distilled. In embodiments, the ethanol produced in the bioreactor is then removed using a membrane. In embodiments, the ethanol produced in the bioreactor is then dehydrated using pressure swing adsorption. In embodiments, the ethanol produced in the bioreactor is then dehydrated using an adsorbent. In embodiments, the ethanol produced in the bioreactor is then dehydrated using 3 angstrom molecular sieves.

In embodiments, the bioreactor includes one or more type of bioreactors selected from the group consisting of a continuous stirred tank bioreactor, a bubble column bioreactor, a microbubble reactor, an airlift bioreactor, a fluidized bed bioreactor, a packed bed bioreactor, a photo-bioreactor, and combinations thereof. In embodiments, the microorganisms used within the bioreactor include genetically modified organisms. In embodiments, the microorganisms used within the bioreactor do not include genetically modified organisms. In embodiments, the microorganisms used within the bioreactor include gas fermenting organisms. In embodiments, the microorganisms used within the bioreactor undergo anaerobic respiration. In embodiments, the microorganisms used within the bioreactor undergo fermentation. In embodiments, the microorganisms used within the bioreactor include anaerobic bacteria. In embodiments, the bioreactor includes a liquid nutrient medium used for culturing the microorganisms and the substance is produced within the bioreactor by the microorganisms which secrete the substance which accumulates within the liquid nutrient medium. In embodiments, the substance is upgraded into a liquid fuel such as a chemical, dimethyl ether, ethanol, Fischer-Tropsch product, methanol, mixed alcohols, an alcohol, 1-butanol, 2-butanol, jet fuel, gasoline, a liquid fuel, a hydrocarbon, a lipid, an emulsion, and/or diesel.

In embodiments, the post-processing system (B) processes said halogen-depleted gas (55) to produce a product (B3), wherein said product (B3) comprises one or more products selected from the group consisting of post-processed biogas, renewable natural gas, a chemical, a liquid fuel, dimethyl ether, ethanol, Fischer-Tropsch product, hydrogen, methanol, mixed alcohols, an alcohol, 1-butanol, 2-butanol, jet fuel, gasoline, a non-halogenated hydrocarbon, a hydrocarbon, a lipid, an emulsion, diesel, and power.

In embodiments, halogenated volatile organic compounds are included within the gas and/or said gas derived from said source of biogas (A0) supplied to the pre-processing system (A). In embodiments, the halogenated volatile organic compounds are subjected to processing within the pre-processing system (A), wherein said halogen portion within the halogenated volatile organic compound is dissociated from the halogenated volatile organic compound and may be converted into an acid wherein the acid and/or the halogen may then be removed with a downstream material. In embodiments, the dissociated halogen merges with a water molecule and/or hydrogen to form the acid, and the acid is then removed from the pre-processed biogas in the halogen processing system. In embodiments, the halogen is dissociated from the halogenated volatile organic compounds within the pre-processing system that includes a heating process, combustion process, a catalytic process, a non-catalytic process, and/or a catalytic oxygen reduction process, wherein the source of biogas and/or said gas derived from said source of biogas (A0) is subjected to a heating process and/or a combustion step to combust at least a portion of the oxygen with at least a portion of the methane and/or at least a portion of the halogenated volatile organic compounds to produce the pre-processed gas (A3).

In embodiments, the pre-processed gas (A3) includes combustion products comprising carbon dioxide and water vapor and/or hydrogen, as well as the acid which merges with the water and/or hydrogen to form the acid. In embodiments, the pre-processed gas (A3) includes combustion products comprising carbon dioxide and an acid, wherein the acid is formed during in pre-processing system (A) during the pre-processing of the biogas and/or said gas derived from said source of biogas (A0). In embodiments, the halogen that is included within the halogenated volatile organic compound includes one or more halogens selected from the group consisting of fluorine, chlorine, bromine, iodine, astatine, and ununseptium. In embodiments, the halogen includes two or more halogens selected from the group consisting of fluorine, chlorine, bromine, iodine, astatine, and ununseptium.

In embodiments, the halogenated volatile organic compounds are subjected to processing within the pre-processing system (A), wherein said halogen portion within the halogenated volatile organic compound is dissociated from the halogenated volatile organic compound, and the halogen is then supplied to the material (40). In embodiments, the said material (40) processes and/or removes said halogen from said gas by contacting said halogen with at least a portion of said material (40). The dissociated halogen contacts the material (40) and forms a compound and the halogen is then separated from the gas and retained within the halogen processing system (100). For example, the halogen may form a salt within the halogen processing system (100) when the halogen contacts the material (40). For example, the halogen may form a compound within the halogen processing system (100) when the halogen contacts the material (40). This may be accomplished by reaction of the halogen with at least a portion of the material (40). For example, in embodiments, the halogen contacts at least a portion of the material (40) and dissociates, reacts, combines, adsorbs, absorbs, deposits, fuses, attracts, adheres, clings, binds, unites, joins, assimilates, converts, polymerizes, and/or catalyzes, with, onto, into, in response to, within, with the assistance of, and/or on a surface of at least a portion of said material (40). In embodiments, the material (40) processes and/or removes at least a portion of the halogen from the halogen-laden biogas to produce a halogen-depleted biogas comprising a reduces amount of the halogen relative to the halogen-laden biogas.

In embodiments, halogenated volatile organic compounds are included within the biogas and/or said gas derived from said source of biogas (A0) supplied to the pre-processing system (A). In embodiments, the halogenated volatile organic compounds are subjected to processing within the pre-processing system (A), wherein said halogen portion within the halogenated volatile organic compound is dissociated from the halogenated volatile organic compound. The halogen may then be removed from the halogen-laden gas (50) with the material (40).

In embodiments, the pre-processing system (A) processes said biogas and/or said gas derived from said source of biogas (A0) to remove oxygen therefrom to produce a pre-processed gas (A3) or a halogen-laden gas (50). In embodiments, the pre-processing system (A) comprises a heating process, combustion process, and/or a catalytic oxygen reduction process to reduce, decrease, and/or combust at least a portion of the oxygen within said biogas and/or said gas derived from said source of biogas (A0) to produce a pre-processed gas (A3), or a halogen-laden gas (50), comprising a reduced amount of oxygen relative to said first biogas and/or said gas derived from said source of biogas (A0). In embodiments, heating, catalytic reaction, a non-catalytic reaction, and/or combustion of said oxygen within said biogas and/or said gas derived from said source of biogas (A0) produces carbon dioxide and water vapor, wherein said pre-processed gas (A3) or a halogen-laden gas (50) comprises a halogen and a reduced amount of oxygen and an increased amount of carbon dioxide and water vapor relative to said first biogas and/or said gas derived from said source of biogas (A0).

In embodiments, the oxygen concentration in the pre-processed gas (A3) or a halogen-laden gas (50) includes one or more concentration ranges selected from the group consisting of 0 to 0.1 volume percent of oxygen (vol %), 0.1 to 0.2 vol %, 0.2 to 0.3 vol %, 0.3 to 0.4 vol %, 0.4 to 0.5 vol %, 0.5 to 0.6 vol %, 0.6 to 0.7 vol %, 0.7 to 0.8 vol %, 0.8 to 0.9 vol %, 0.9 to 1 vol %, 1 to 1.1 vol %, 1.1 to 1.2 vol %, 1.2 to 1.3 vol %, 1.3 to 1.4 vol %, 1.4 to 1.5 vol %, 1.5 to 1.6 vol %, 1.6 to 1.7 vol %, 1.7 to 1.8 vol %, 1.8 to 1.9 vol %, 1.9 to 2 vol %, 2 to 2.25 vol %, 2.25 to 2.5 vol %, 2.5 to 2.75 vol %, 2.75 to 3 vol %, 3 to 3.25 vol %, 3.25 to 3.5 vol %, 3.5 to 3.75 vol %, 3.75 to 4 vol %, 4 to 4.25 vol %, 4.25 to 4.5 vol %, 4.5 to 4.75 vol %, 4.75 to 5 vol %, 5 to 6 vol %, 6 to 7 vol %, 7 to 8 vol %, 8 to 9 vol %, 9 to 10 vol %, and 10 to 15 vol %.

In embodiments, the oxygen concentration in the product (B3) includes one or more concentration ranges selected from the group consisting of 0 to 0.01 volume percent of oxygen (vol %), 0.01 to 0.02 vol %, 0.02 to 0.03 vol %, 0.03 to 0.04 vol %, 0.04 to 0.05 vol %, 0.05 to 0.06 vol %, 0.06 to 0.07 vol %, 0.07 to 0.08 vol %, 0.08 to 0.09 vol %, 0.09 to 0.1 vol %, 0.1 to 0.15 vol %, 0.15 to 0.2 vol %, 0.2 to 0.25 vol %, 0.25 to 0.3 vol %, 0.3 to 0.35 vol %, 0.35 to 0.4 vol %, 0.4 to 0.45 vol %, 0.45 to 0.5 vol %, 0.5 to 0.55 vol %, 0.55 to 0.6 vol %, 0.6 to 0.65 vol %, 0.65 to 0.7 vol %, 0.7 to 0.75 vol %, 0.75 to 0.8 vol %, 0.8 to 0.85 vol %, 0.85 to 0.9 vol %, 0.9 to 0.95 vol %, 0.95 to 1 vol %, 1 to 1.5 vol %, 1.5 to 2 vol %, 2 to 2.5 vol %, 2.5 to 3 vol %, 3 to 3.5 vol %, 3.5 to 4 vol %, 4 to 4.5 vol %, 4.5 to 5 vol %, and greater than 5 vol %.

In embodiments, said pre-processed gas (A3) or a halogen-laden gas (50) is then supplied to said halogen processing system (100) to remove halogen therefrom then supplied to a post-processing system (B) comprising for further processing into a product (B3). In embodiments, said pre-processed gas (A3) or a halogen-laden gas (50) is then supplied to said halogen processing system (100) to remove halogen therefrom then supplied to a post-processing system (B) comprising water removal for further processing. In embodiments, the halogen processing system (100) processes and/or removes the halogen and/or an acid comprising the halogen to produce a halogen-depleted gas (55).

In embodiments, the water that is removed may be condensed within and/or downstream of the halogen processing system (100) and may be acidic and may require additional processing such as a treatment and/or neutralization process. In embodiments, a liquid hydrocarbon comprising an undesirable compound may be condensed within and/or downstream of the halogen processing system (100) and may be acidic and may require additional processing such as a treatment and/or neutralization process. In embodiments, the neutralization process comprises a chemical reaction process whereby said acidic condensate is mixed with a base. In embodiments, the neutralization process reduces at least a portion of excess hydrogen and/or hydroxide ions present in the acidic condensate removed in the water and/or liquid removal process.

FIG. 4 describes the following halogenated volatile organic compound removal process, comprising:

a halogenated volatile organic compound processing system (A) configured to accept said source of biogas and/or said gas derived from said source of biogas (A0) comprising one or two or more of the group consisting of methane, oxygen, and a halogenated volatile organic compound, and within said halogenated volatile organic compound processing system (A) subjecting said source of biogas and/or said gas derived from said source of biogas (A0) to heating, partial oxidation process, hydrogen reaction, a catalytic process, a non-catalytic process, and/or a combustion process, an autothermal reforming process, a steam reforming process, a hydrogen production process, water gas shift reaction, a Sabatier reaction, methanation, an electrolysis process, to produce a pre-processed gas (A3), said pre-processed gas (A3) comprises a reduced amount of said oxygen, and/or a reduced amount of said halogenated volatile organic compound relative to said source of biogas and/or said gas derived from said source of biogas (A0), wherein the halogen portion of said halogenated volatile organic compound is dissociated into said halogen by said heating, catalytic reaction, and/or combustion process, wherein said halogen may combine with water vapor, hydrogen, an ion, and/or an electron donor within said pre-processed gas (A3) to produce an acid, said pre-processed gas (A3) comprises said halogen and/or said acid and is evacuated from said pre-processing system (A) and supplied to a halogen processing system (100);

said halogen processing system (100) accepts said pre-processed gas (A3) from said pre-processing system (A), said halogen processing system (100) processes and/or removes said halogen and/or said acid (including the halogen) from said pre-processed gas (A3) to produce a halogen-depleted gas (55), said halogen-depleted gas (55) is evacuated from said halogen processing system (100) and supplied to a post-processing system (B), wherein said halogen-depleted gas (55) comprises a reduced amount of said halogen relative to said pre-processed gas (A3); and said post-processing system (B) accepts said halogen-depleted gas (55) from said halogen processing system (100) and processes said halogen-depleted gas (55) within said post-processing system (B) to produce said product (B3). In embodiments, the halogen processing system (100) includes a halogen processing system to remove an acid and produce an acid-depleted biogas wherein the acid includes at least a portion of the halogen.

FIG. 5

Figure 5:
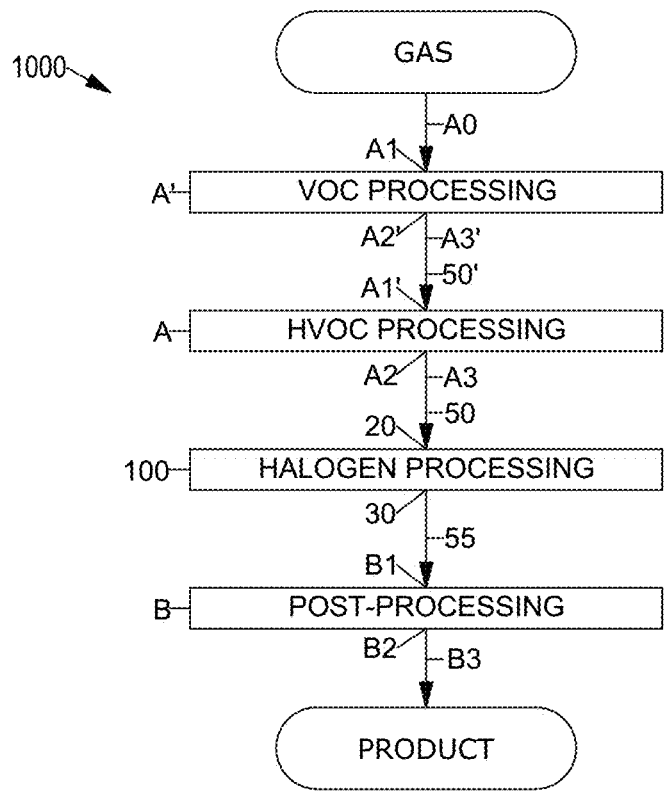
FIG. 5 describes a non-limiting two-stage volatile organic compound removal process.

FIG. 5 describes a non-limiting two-stage volatile organic compound removal process, comprising:

a volatile organic compound processing system (A') configured to accept said source of biogas and/or said gas derived from said source of biogas (A0) comprising methane and a volatile organic compound, and process said biogas and/or said gas derived from said source of biogas (A0) within said volatile organic compound processing system (A') to produce a pre-processed gas (A3'), said pre-processed gas (A3') is evacuated from said volatile organic compound processing system (A') and supplied to a halogenated volatile organic compound processing system (A), said pre-processed gas (A3') comprises a reduced amount of said volatile organic compound relative to said source of biogas and/or said gas derived from said source of biogas (A0); wherein said a volatile organic compounds may be subjected to a separation process (e.g. adsorption, absorption, reaction, membrane, catalytic process, non-catalytic process, distillation, crystallization, sublimation, chromatography, sedimentation, electrophoresis, reverse osmosis, filtration) within said a volatile organic compound processing system (A') to produce said pre-processed gas (A3');

said halogenated volatile organic compound processing system (A) is configured to accept said source of pre-processed gas (A3') comprising two or more selected from the group consisting of methane, oxygen, and a halogenated volatile organic compound, and within said halogenated volatile organic compound processing system (A) subjecting said pre-processed gas (A3') to a heating, catalytic process, a non-catalytic process, a reaction, and/or combustion process to produce a secondary pre-processed gas (A3), said secondary pre-processed gas (A3) comprises a reduced amount of said oxygen, and/or a reduced amount of said halogenated volatile organic compound relative to said pre-processed gas (A3'), wherein the halogen portion of said halogenated volatile organic compound is dissociated into said, wherein said halogen may combine with water vapor, hydrogen, an ion, and/or an electron donor within said secondary pre-processed gas (A3) to produce an acid, said secondary pre-processed gas (A3) comprises said halogen and/or said acid and is evacuated from said pre-processing system (A) and supplied to a halogen processing system (100);

said halogen processing system (100) accepts said pre-processed gas (A3) from said pre-processing system (A), said halogen processing system (100) processes and/or removes said halogen and/or said acid (including the halogen) from said pre-processed gas (A3) to produce a halogen-depleted gas (55), said halogen-depleted gas (55) is evacuated from said halogen processing system (100) and supplied to a post-processing system (B), wherein said halogen-depleted gas (55) comprises a reduced amount of said acid and/or said halogen relative to said pre-processed gas (A3); and said post-processing system (B) accepts said halogen-depleted gas (55) from said halogen processing system (100) and processes said halogen-depleted gas (55) within said post-processing system (B) to produce said product (B3).

In embodiments, the volatile organic compound processing system (A') also processes and/or removes halogenated volatile organic compounds. In embodiments, the volatile organic compound processing system (A') comprises a vacuum pressure swing adsorption process. In embodiments, the volatile organic compound processing system (A') comprises a pressure swing adsorption process. In embodiments, the volatile organic compound processing system (A') comprises a temperature swing adsorption process. In embodiments, the volatile organic compound processing system (A') comprises a separation process (e.g. adsorption, absorption, reaction, combustion, membrane, catalytic process, non-catalytic process, distillation, crystallization, sublimation, chromatography, sedimentation, electrophoresis, reverse osmosis, condensation, solidification, filtration).

FIG. 6

Figure 6:
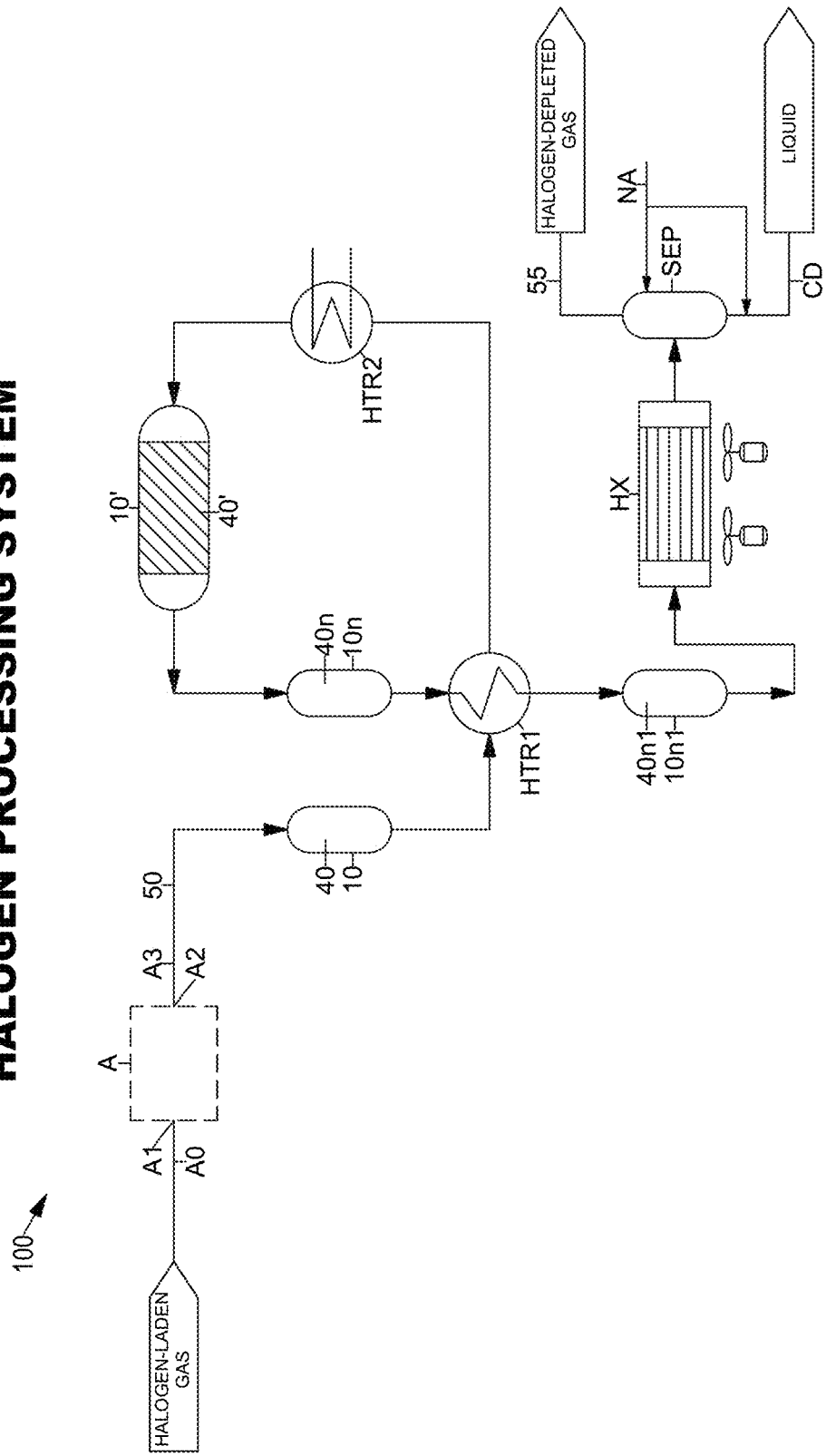
FIG. 6 depicts a non-limiting embodiment of a halogen processing system (100).

FIG. 6 depicts a non-limiting embodiment of a halogen processing system (100). In embodiments, FIG. 6 includes a pre-processing system (A) for accepting a biogas and/or said gas derived from said source of biogas (A0) to produce a pre-processed gas (A3). The pre-processing system (A) accepts the biogas and/or a gas derived from said source of biogas (A0) via an inlet (A1) and outputs a pre-processed gas (A3) via an outlet (A2). In embodiments, the biogas and/or said gas derived from said source of biogas (A0) includes a halogen and comprises a halogen-laden gas (50). In embodiments, the pre-processed gas (A3) includes a halogen and comprises a halogen-laden gas (50). In embodiments, the halogen-laden gas (50) is supplied to a first vessel (10) comprising a first material (40).

In embodiments, the first material (40) comprises a metal. In embodiments, the first material (40) comprises a plurality of metals. In embodiments, the first material (40) comprises an absorbent including a metal. In embodiments, the first material (40) comprises an absorbent including a plurality of metals. In embodiments, the metal includes one or more metals selected from the group consisting of a precious metal, an alkali metal, an alkaline earth metal, a transition metal, a rare earth metal, an actinide, and a post-transition metal. In embodiments, the first material (40) comprises copper.

In embodiments, the pre-processed gas (A3) comprises a halogen, and said halogen dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to remove at least a portion of said halogen from said pre-processed gas (A3).

In embodiments, the pre-processed gas (A3) is heated in a first heater (HTR1). In embodiments, the first heater (HTR1) heats the pre-processed gas (A3) by indirectly contacting the pre-processed gas (A3) with gas evacuated from at least a second vessel (10') and/or a third vessel (10n).

Heat in the form of thermal energy is supplied from gas evacuated from either a second vessel (10') and/or a third vessel (10n) and is indirectly transferred to the pre-processed gas (A3) via the first heater (HTR1). In embodiments, the first heater (HTR1) comprises one or more selected from the group consisting of a heat exchanger, a process heater, and an economizer. In embodiments, the pre-processed gas (A3) is then supplied to a second heater (HTR2) to further heat the pre-processed biogas (A3) prior to being supplied to a second vessel (10') comprising a second material (40').

In embodiments, the pre-processed gas (A3) supplied to the second vessel (10') comprises oxygen, wherein at least a portion of said oxygen is reacted, mixed, converted, and/or consumed by the second material (40') to produce a processed gas mixture, wherein said processed gas mixture includes a reduced amount of oxygen relative to said pre-processed gas (A3).

In embodiments, the second material (40') comprises a catalyst. In embodiments, the second material (40') comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite. In embodiments, within the second vessel (10'), at least a portion of the oxygen within said processed gas mixture is reacted with one or more selected from the group consisting of a volatile organic compound, a sulfur-containing compound, the halogenated volatile organic compound, an oxygen-containing gas, an alcohol, water, a hydrocarbon, methane, a catalyst, and a scavenger.

In embodiments, a processed gas mixture is discharged from the second vessel (10') and is supplied to a third vessel (10n), wherein the third vessel (10n) includes a third material (40n). In embodiments, the processed gas mixture discharged from the second vessel (10') comprises an acid, a primary compound, and/or a secondary compound, wherein the acid, the primary compound, and/or the secondary compound, is produced in the second vessel (10'). In embodiments, at least a portion of the halogen within the pre-processed gas (A3) is converted into an acid within the second vessel (10') by contacting said second material (40') with hydrogen (generated in-situ or supplied), a heating process, a partial oxidation process, and/or a combustion process within said second vessel (10'). In embodiments, at least a portion of the halogen within the pre-processed gas (A3) combines with said water vapor and/or hydrogen within said pre-processed gas to produce said acid, said primary compound, and/or said secondary compound. In embodiments, hydrogen, an acid, a primary compound, a secondary compound, and/or an undesirable compound is produced in the second vessel (10').

In embodiments, an acid is generated from at least a portion of the halogen present within the pre-processed gas (A3) within the second vessel (10'). In embodiments, an acid is present within the processed gas mixture, and the third material (40n) separates at least a portion of the acid therefrom to produce a halogen-depleted gas. Further, in embodiments, an acid may be produced within the third vessel (10n) in the presence of the third material (40n).

In embodiments, the third material (40n) separates the acid from the processed gas mixture to produce said halogen-depleted gas. In embodiments, said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said third material, to separate said acid from said processed gas mixture and produce said halogen-depleted gas.

In embodiments, said third material (40n) comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, said acid forms a salt with, onto, into, in response to, within, with the assistance of, and/or on a surface of at least a portion of said third material (40n), to separate said acid from said processed gas mixture and produce said halogen-depleted gas. In embodiments, at least a portion of said gas, other than said halogen, produces a secondary compound within the third vessel (10n). In embodiments, the secondary compound comprises one or more secondary compounds selected from the group consisting of hydrogen, a hydrocarbon, a hydrocarbon mixture, a halogenated hydrocarbon, said acid, a sulfur compound, a salt, carbon, carbon monoxide, water, an ion, an anion, a cation, a free radical, an unsaturated compound, an unsaturated hydrocarbon, a polymer, green oil, an organic chloride, a metal complex, ionic polymerization termination, coordination polymerization termination, and free radical polymerization termination.

In embodiments, a halogen-depleted gas is evacuated from the third vessel (10n) and is routed to the first heater (HTR1) to heat the pre-processed biogas (A3). After the halogen-depleted gas is heated in the first heater (HTR1) it may be routed to a fourth vessel (10n1) comprising a fourth material (40n1).

In embodiments, at least a portion of the secondary compound generated in the second vessel (10') and/or the third vessel (10n) is removed by the fourth vessel (10n1) by the fourth material (40n1). In embodiments, the said secondary compound dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said fourth material (40n1), to separate said secondary compound therefrom and produce a secondary compound-depleted gas.

In embodiments, the gas evacuated from the fourth vessel (10n1) comprises a reduced amount of the secondary compound relative to the gas supplied to the fourth vessel (10n1). In embodiments, the gas evacuated from the fourth vessel (10n1) comprises secondary compound-depleted gas.

In embodiments, the gas evacuated from the fourth vessel (40n1), e.g. the secondary compound-depleted gas, may be supplied to a cooler (HX) to reduce its temperature and produce a cooled gas. In embodiments, the cooler (HX) comprises one or more selected from the group consisting of a heat exchanger, a process cooler, and an air-cooled heat exchanger.

In embodiments, the air-cooled heat exchanger uses ambient air to cool the gas passing through it. In embodiments, the air-cooled heat exchanger comprises a plurality of tubes comprising fins attached thereto, wherein the fins provide increased surface area for heat transfer, improving the efficiency of the cooler (HX). In embodiments, the air-cooled heat exchanger operates by forced convection wherein a fan, or a plurality of fans, blow ambient air over the finned tubes to facilitate heat transfer within the cooler (HX). In embodiments, the gas is supplied thereto and is distributed to a plurality of finned tubes, heat is transferred to the gas by blowing air over the fins, carrying heat away from the cooler (HX) and reducing the temperature of the gas, where it then exits the cooler (HX), and condensate is separated therefrom to produce the halogen-depleted gas.

A separator (SEP) is positioned downstream of the cooler (HX) to separate condensate (CD) in liquid form from the cooled gas. A neutralizing agent (NA) including a base may be supplied to the separator (SEP) and/or to the condensate (CD) separated via the separator.

In embodiments, the neutralizing agent (NA) changes a pH of the condensate. In embodiments, the neutralizing agent (NA) neutralizes a pH of the condensate. In embodiments, the neutralizing agent (NA) adjusts a pH of the condensate to a desired level. In embodiments, the neutralizing agent (NA) comprises a base. In embodiments, the neutralizing agent (NA) comprises a base which increases the pH of the condensate. In embodiments, the neutralizing agent (NA) comprises an acid. In embodiments, the neutralizing agent (NA) comprises an acid which decreases the pH of the condensate.

A halogen-depleted gas (55) is evacuated from the halogen processing system (100), wherein the halogen-depleted gas (55) comprises a reduced amount of the halogen relative to the halogen-laden gas (50) and/or the pre-processed gas (A3).

FIG. 7

Figure 7:
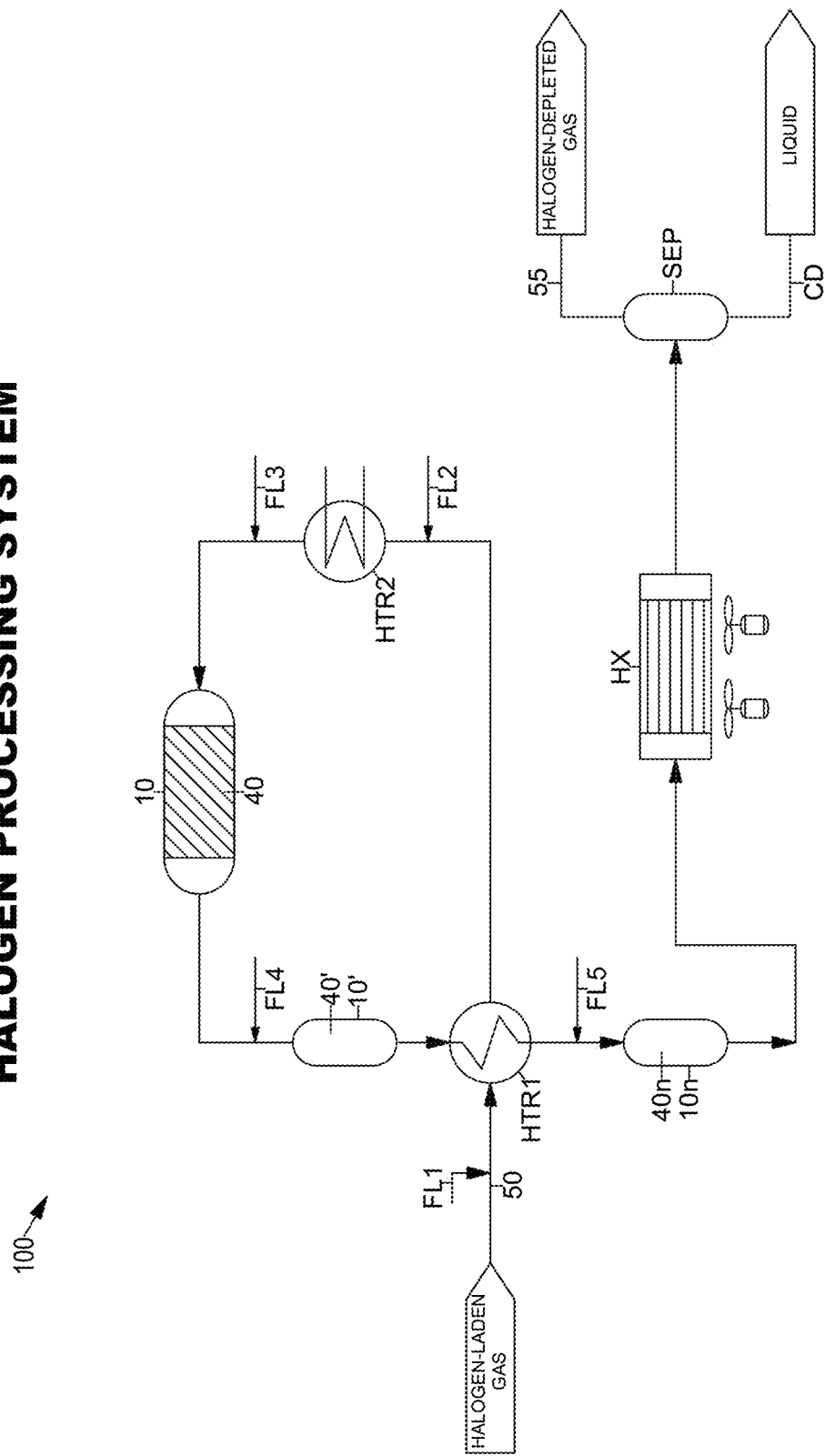
FIG. 7 depicts another non-limiting embodiment of a halogen processing system (100).

FIG. 7 depicts another non-limiting embodiment of a halogen processing system (100). In embodiments, FIG. 7 includes a halogen-laden gas (50) heated in a first heater (HTR1). In embodiments, the first heater (HTR1) heats the halogen-laden gas (50) by indirectly contacting the halogen-laden gas (50) with gas evacuated from at least a first vessel (10) and/or a second vessel (10').

Heat in the form of thermal energy is supplied from gas evacuated from either a first vessel (10) and/or a second vessel (10') and is indirectly transferred to the halogen-laden gas (50) via the first heater (HTR1). In embodiments, the first heater (HTR1) comprises one or more selected from the group consisting of a heat exchanger, a process heater, and an economizer. In embodiments, the halogen-laden gas (50) is then supplied to a second heater (HTR2) to further heat the halogen-laden gas (50) prior to being supplied to a first vessel (10) comprising a first material (40).

In embodiments, a fluid (FL1) may be mixed with the halogen-laden gas (50), either upstream, of the first heater (HTR1), upstream of the second heater (HTR2), and/or downstream of the second heater (HTR2). In embodiments, the fluid (FL1, FL2, FL3, FL4, FL5, FLA, FLB, FLD, FLE, FLF, FLG, FLH) comprises hydrogen.

In embodiments, the fluid (FL1, FL2, FL3, FL4, FL5, FLA, FLB, FLD, FLE, FLF, FLG, FLH) comprises hydrogen, said hydrogen comprises a gas and/or said hydrogen is derived from one or more selected from the group consisting of a partial oxidation process, an autothermal reforming process, a steam reforming process, a hydrogen production process, water gas shift reaction, a Sabatier reaction, methanation, an electrolysis process, a source of biogas, water, an alcohol, and a hydrocarbon.

In embodiments, the fluid (FL1, FL2, FL3, FL4, FL5, FLA, FLB, FLD, FLE, FLF, FLG, FLH) comprises one or more selected from the group consisting of volatile organic compound, a sulfur-containing compound, the halogenated volatile organic compound, oxygen, an oxygen-containing gas, an alcohol, water, a hydrocarbon, methane, a catalyst, and a scavenger.

In embodiments, the halogen-laden gas (50) supplied to the first vessel (10) comprises oxygen, wherein at least a portion of said oxygen is reacted, mixed, converted, and/or consumed by the first material (40) to produce a processed gas mixture, wherein said processed gas mixture includes a reduced amount of oxygen relative to said halogen-laden gas (50).

In embodiment, hydrogen is produced in the first vessel (10). In embodiments, the first vessel (10') produces the hydrogen by a partial oxidation process, an autothermal reforming process, a steam reforming process, a hydrogen production process, water gas shift reaction, a Sabatier reaction, and/or methanation. In embodiments, the first material (40) comprises a catalyst. In embodiments, the catalyst includes a metal or a plurality of metals.

In embodiments, the first material (40) comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite. In embodiments, within the first vessel (10), at least a portion of the oxygen within said processed gas mixture is reacted with one or more selected from the group consisting of an alcohol, water, a hydrocarbon, methane, a material, a catalyst, a scavenger, and hydrogen.

In embodiments, a processed gas mixture is discharged from the first vessel (10) and is supplied to a second vessel (10'), wherein the second vessel (10') includes a second material (40'). In embodiments, the processed gas mixture discharged from the first vessel (10) comprises an acid, wherein the acid is produced in the first vessel (10). In embodiments, at least a portion of the halogen within the gas derived from and/or including a source of biogas, the halogen-laden gas (50), and/or the pre-processed gas (A3) is converted into an acid within the first vessel (10) by contacting said first material (40), reaction with hydrogen (generated in-situ and/or supplied as a fluid), a heating process, a partial oxidation process, and/or a combustion process, an autothermal reforming process, a steam reforming process, a hydrogen production process, water gas shift reaction, a Sabatier reaction, methanation, an electrolysis process, within said first vessel (10). In embodiments, at least a portion of the halogen within the halogen-laden gas (50) combines with said water vapor within said pre-processed gas to produce said acid.

In embodiments, an acid is generated from at least a portion of the halogen present within the halogen-laden gas (50) within the first vessel (10). In embodiments, an acid is present within the processed gas mixture, and the second material (40') separates at least a portion of the acid therefrom to produce a halogen-depleted gas. In embodiments, a fluid (FL4) may be mixed processed gas mixture after evacuated from the first vessel (10). In embodiments, the fluid (FL4) comprises hydrogen. In embodiments, the fluid (FL4) comprises hydrogen, said hydrogen comprises a gas and/or said hydrogen is derived from one or more selected from the group consisting of a partial oxidation process, an autothermal reforming process, a steam reforming process, a hydrogen production process, water gas shift reaction, a Sabatier reaction, methanation, an electrolysis process, a source of biogas, water, an alcohol, and a hydrocarbon. In embodiments, the fluid (FL4) comprises one or more selected from the group consisting of a volatile organic compound, a sulfur-containing compound, the halogenated volatile organic compound, oxygen, an oxygen-containing gas, an alcohol, water, a hydrocarbon, methane, a catalyst, and a scavenger.

In embodiments, the second material (40') separates the acid from the processed gas mixture to produce said halogen-depleted gas. In embodiments, said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said second material (40'), to separate said acid from said processed gas mixture and produce said halogen-depleted gas.

In embodiments, said second material (40') comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, the second material (40') may also serve as a sulfur removal step, wherein the gas derived from and/or including a source of biogas, the halogen-laden gas (50), and/or the pre-processed gas (A3) includes sulfur, and at least a portion of said sulfur reacts with said hydrogen fluid to produce hydrogen sulfide, said processed gas mixture includes said hydrogen sulfide. The processed gas mixture and/or said halogen-depleted gas comprising said hydrogen sulfide may then be subjected to a hydrogen sulfide removal process to remove at least a portion of said hydrogen sulfide from said processed gas mixture and/or said halogen-depleted gas and produce a sulfur-depleted gas, said sulfur-depleted gas comprises a reduced amount of said hydrogen sulfide relative to said processed gas mixture and/or said halogen-depleted gas. The second material (40') may remove both an acid and the sulfur.

In embodiments, said acid forms a salt with, onto, into, in response to, within, with the assistance of, and/or on a surface of at least a portion of said second material (40'), to separate said acid from said processed gas mixture and produce said halogen-depleted gas. In embodiments, at least a portion of said gas, other than said halogen, produces a secondary compound within the first vessel (10) and/or the second vessel (10'). In embodiments, the secondary compound comprises one or more secondary compounds selected from the group consisting of hydrogen, a hydrocarbon, a halogenated hydrocarbon, said acid, a sulfur compound, a salt, carbon, carbon monoxide, water, an ion, an anion, a cation, a free radical, an unsaturated compound, an unsaturated hydrocarbon, a polymer, green oil, an organic chloride, a metal complex, ionic polymerization termination, coordination polymerization termination, and free radical polymerization termination.

In embodiments, a halogen-depleted gas is evacuated from the second vessel (10') and is routed to the first heater (HTR1) to heat the halogen-laden gas (50), and to cool the halogen-depleted gas travelling in indirect, thermal contact within the first heater (HTR1). After the halogen-depleted gas is heated in the first heater (HTR1) it may be routed to a third vessel (10n) comprising a third material (40n).

In embodiments, a fluid (FL5) may be mixed processed gas mixture after evacuated from the first vessel (10). In embodiments, the fluid (FL5) comprises hydrogen. In embodiments, the fluid (FL5) comprises hydrogen, said hydrogen comprises a gas and/or said hydrogen is derived from one or more selected from the group consisting of a partial oxidization process, an autothermal reforming process, a steam reforming process, a hydrogen production process, water gas shift reaction, a Sabatier reaction, methanation, an electrolysis process, a source of biogas, water, an alcohol, and a hydrocarbon. In embodiments, the fluid (FL5) comprises one or more selected from the group consisting of a volatile organic compound, a sulfur-containing compound, the halogenated volatile organic compound, oxygen, an oxygen-containing gas, an alcohol, water, a hydrocarbon, methane, a catalyst, and a scavenger.

In embodiments, at least a portion of the secondary compound generated in the first vessel (10) and/or second vessel (10') is removed by the third vessel (10n) by the third material (40n). In embodiments, the said secondary compound dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said third material (40n), to separate said secondary compound therefrom and produce a secondary compound-depleted gas. In embodiments, the secondary compound-depleted gas comprises the halogen-depleted gas (55).

In embodiments, the gas evacuated from the third vessel (10n) comprises a reduced amount of the secondary compound relative to the gas supplied to the third vessel (10n). In embodiments, the gas evacuated from the third vessel (10n) comprises a reduced amount of the secondary compound relative to the process gas mixture supplied to the third vessel (10n). In embodiments, the gas evacuated from the third vessel (10n) comprises secondary compound-depleted gas.

In embodiments, the gas evacuated from the third vessel (40n), e.g. the secondary compound-depleted gas, may be supplied to a cooler (HX) (similar to as shown and described in FIG. 6) to reduce its temperature and produce a cooled gas.

A separator (SEP) is positioned downstream of the cooler (HX) to separate condensate (CD) in liquid form from the cooled gas. A neutralizing agent (NA) including a base may be supplied to the separator (SEP) and/or to the condensate (CD) separated via the separator (similar to as shown and described in FIG. 6).

A halogen-depleted gas (55) is evacuated from the halogen processing system (100), wherein the halogen-depleted gas (55) comprises a reduced amount of the halogen relative to the halogen-laden gas (50) and/or the pre-processed gas (A3).

FIG. 8

Figure 8:
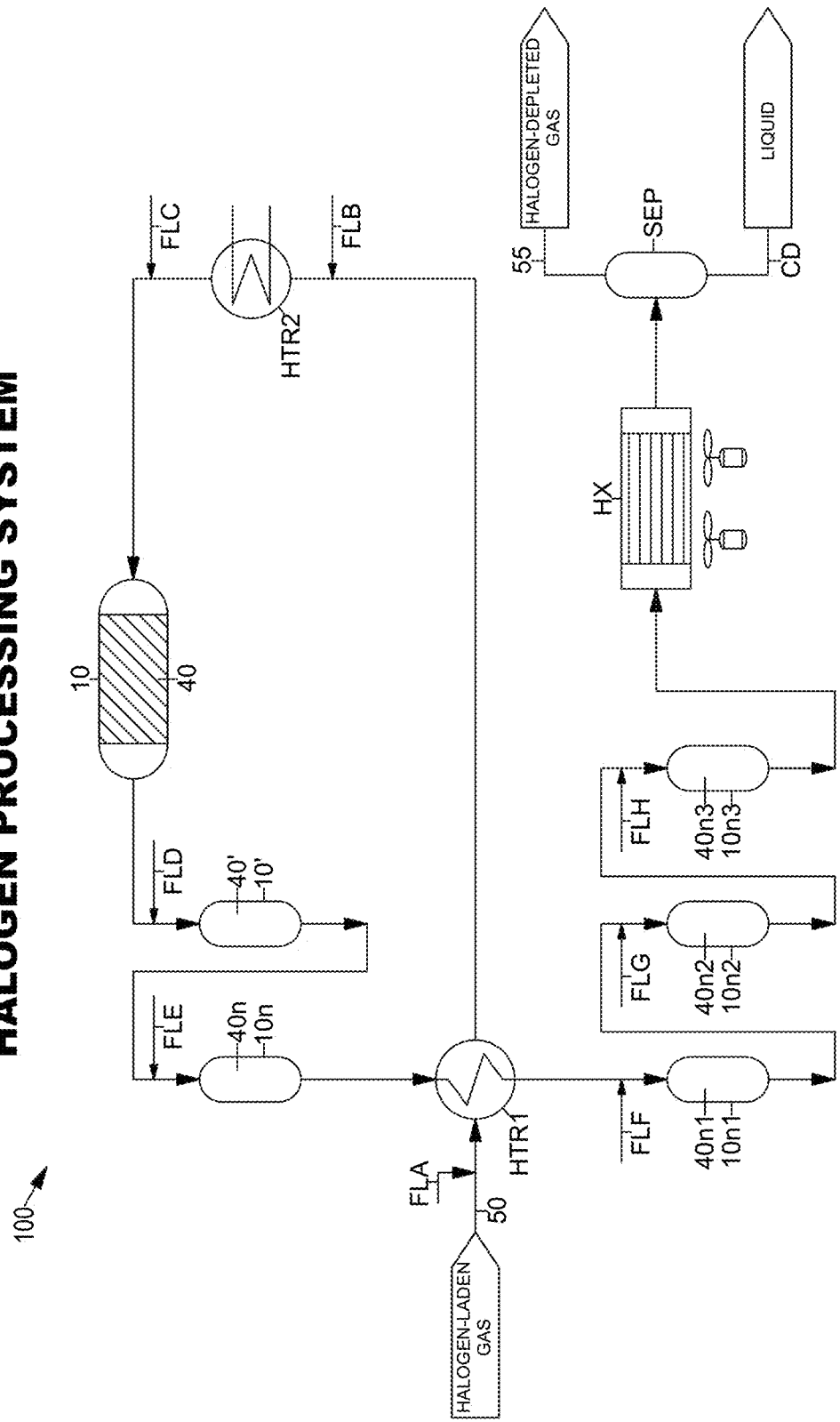
FIG. 8 depicts another non-limiting embodiment of a halogen processing system (100).

FIG. 8 depicts another non-limiting embodiment of a halogen processing system (100). In embodiments, FIG. 8 includes a halogen-laden gas (50) heated in a first heater (HTR1). In embodiments, the first heater (HTR1) heats the halogen-laden gas (50) by indirectly contacting the halogen-laden gas (50) with gas evacuated from at least a first vessel (10), a second vessel (10'), and/or a third vessel (10n).

In embodiments, a fluid (FLA) may be mixed with the halogen-laden gas (50), upstream of the first heater (HTR1). Heat in the form of thermal energy is supplied from gas evacuated from either a first vessel (10), a second vessel (10'), and/or a third vessel (10n) and is indirectly transferred to the halogen-laden gas (50) via the first heater (HTR1). In embodiments, the halogen-laden gas (50) is then supplied to a second heater (HTR2) to further heat the halogen-laden gas (50) prior to being supplied to a first vessel (10) comprising a first material (40). In embodiments, the second heater (HTR2) includes an electric heater, a gas-fired heater, a heat exchanger, a process heater, and/or a heat exchanger. In embodiments, heat can be generated from an exothermic reaction between oxygen and the fluid (FL1, FL2, FL3, FL4, FL5, FLA, FLB, FLD, FLE, FLF, FLG, FLH).

In embodiments, a fluid (FLB, FLC) may be mixed with the halogen-laden gas (50), either upstream of the second heater (HTR2), and/or downstream of the second heater (HTR2). In embodiments, the fluid (FLA, FLB, FLC, FLD, FLE, FLF, FLG, FLH) comprises hydrogen. In embodiments, the fluid (FLA, FLB, FLC, FLD, FLE, FLF, FLG, FLH) comprises hydrogen, said hydrogen comprises a gas and/or said hydrogen is derived from one or more selected from the group consisting of a partial oxidization process, an autothermal reforming process, a steam reforming process, a hydrogen production process, water gas shift reaction, a Sabatier reaction, methanation, an electrolysis process, a source of biogas, water, an alcohol, and a hydrocarbon. In embodiments, the fluid (FLA, FLB, FLC, FLD, FLE, FLF, FLG, FLH) comprises one or more selected from the group consisting of a volatile organic compound, a sulfur-containing compound, the halogenated volatile organic compound, oxygen, an oxygen-containing gas, an alcohol, water, a hydrocarbon, methane, a catalyst, and a scavenger.

In embodiments, the halogen-laden gas (50) supplied to the first vessel (10) comprises oxygen, wherein at least a portion of said oxygen is reacted, mixed, converted, and/or consumed by the first material (40) to produce a processed gas mixture, wherein said processed gas mixture includes a reduced amount of oxygen relative to said halogen-laden gas (50).

In embodiment, hydrogen is produced in the first vessel (10). In embodiments, the first vessel (10') produces the hydrogen by a partial oxidization process, an autothermal reforming process, a steam reforming process, a hydrogen production process, water gas shift reaction, a Sabatier reaction, and/or methanation. In embodiments, the first material (40) comprises a catalyst. In embodiments, the catalyst includes a metal or a plurality of metals.

In embodiments, the first material (40) comprises one or more materials selected from the group consisting of activated alumina, activated carbon, alumina, caustic, carbon, carbon nanotubes, a metal, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite. In embodiments, within the first vessel (10), at least a portion of the oxygen within said processed gas mixture is reacted with one or more selected from the group consisting of a volatile organic compound, a sulfur-containing compound, the halogenated volatile organic compound, oxygen, an oxygen-containing gas, an alcohol, water, a hydrocarbon, methane, a catalyst, and a scavenger.

In embodiments, a processed gas mixture is discharged from the first vessel (10) and is supplied to a second vessel (10'), wherein the second vessel (10') includes a second material (40'). A fluid (FLD) may be supplied mixed with the gas evacuated from the first vessel (10) and a mixture thereof is supplied to the second vessel (10*n*).

In embodiments, the processed gas mixture discharged from the first vessel (10) comprises an acid, said primary compound, and/or said secondary compound. In embodiments, hydrogen, an acid, a primary compound, a secondary compound, and/or an undesirable compound is produced in the second vessel, wherein the acid, the primary compound, and/or the secondary compound is produced in the first vessel (10) and then removed in the second vessel (10') by the second material (40').

In embodiments, the processed gas mixture discharged from the first vessel (10) comprises sulfur. Within the second vessel (10), the second material (40') at least a portion of said sulfur reacts with said hydrogen to produce hydrogen sulfide, said processed gas mixture includes said hydrogen sulfide. The hydrogen sulfide may then be removed within the second vessel (10') or in a later downstream vessel (10*n*1 and/or 10*n*3).

In embodiments, at least a portion of the halogen within the gas derived from and/or including a source of biogas, the halogen-laden gas (50), and/or the pre-processed gas (A3) is converted into an acid within the first vessel (10). The acid may be generated from the halogen in the first vessel (10) by contacting said first material (40), reaction with hydrogen (provided as a fluid, and/or generated within the first vessel (10)), a heating process, a partial oxidation process, and/or a combustion process within said first vessel (10), and/or with the supplied fluid, and/or with the hydrogen generated within the first vessel (10). In embodiments, at least a portion of the halogen within the halogen-laden gas (50) reacts and/or combines with hydrogen and/or water vapor within said first vessel (10) to produce said acid.

In embodiments, an acid is generated from at least a portion of the halogen present within the halogen-laden gas (50) within the first vessel (10). In embodiments, an acid is present within the processed gas mixture, and the second material (40') separates at least a portion of the acid therefrom to produce a halogen-depleted gas. The second vessel (10') may also remove sulfur and/or hydrogen sulfide generated within therein.

In embodiments, a fluid (FLD) may be mixed processed gas mixture after evacuated from the first vessel (10). In embodiments, the fluid (FLD) comprises hydrogen. In embodiments, the fluid (FLD) comprises hydrogen, said hydrogen comprises a gas and/or said hydrogen is generated in-situ within the first vessel (10) and/or the hydrogen is supplied as a fluid (FLD) and is derived from one or more selected from the group consisting of a partial oxidization process, an autothermal reforming process, a steam reforming process, a hydrogen production process, water gas shift reaction, a Sabatier reaction, methanation, an electrolysis process, a source of biogas, water, an alcohol, and a hydrocarbon. In embodiments, the fluid (FLD) comprises one or more selected from the group consisting of volatile organic compound, a sulfur-containing compound, the halogenated volatile organic compound, oxygen, an oxygen-containing gas, an alcohol, water, a hydrocarbon, methane, a catalyst, and a scavenger.

In embodiments, the second material (40') separates at least apportion of the acid from the processed gas mixture, said second material (40') separates said acid from said processed gas mixture to produce said halogen-depleted gas.

In embodiments, the second material (40') separates the hydrogen sulfide from the processed gas mixture with the second material (40'), said second material (40') separates said hydrogen sulfide from said processed gas mixture to produce a hydrogen sulfide-depleted gas. In embodiments, the gas evacuated from the second vessel (40') has a reduced amount of both a halogen and sulfur when compared to the gas discharged from the first vessel (10), and introduced to the second vessel (40').

In embodiments, said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said second material, to separate said acid from said processed gas mixture and produce said halogen-depleted gas.

In embodiments, said second material (40') comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, the second material (40') may also serve as a sulfur removal step, wherein the gas derived from and/or including a source of biogas, the halogen-laden gas (50), and/or the pre-processed gas (A3) includes sulfur, and at least a portion of said sulfur reacts with said hydrogen to produce hydrogen sulfide, said processed gas mixture includes said hydrogen sulfide. The generated hydrogen sulfide can be removed by the second material (40') or is may be passed along to a later vessel (10n1, 10n3) for subsequent removal.

The processed gas mixture and/or said halogen-depleted gas comprising said hydrogen sulfide may then be subjected to a hydrogen sulfide removal process to remove at least a portion of said hydrogen sulfide from said processed gas mixture and/or said halogen-depleted gas and produce a sulfur-depleted gas, said sulfur-depleted gas comprises a reduced amount of said hydrogen sulfide relative to said processed gas mixture and/or said halogen-depleted gas. The second material (40') may remove both an acid and the sulfur.

In embodiments, said acid forms a salt with, onto, into, in response to, within, with the assistance of, and/or on a surface of at least a portion of said second material (40'), to separate said acid from said processed gas mixture and produce said halogen-depleted gas. In embodiments, said hydrogen sulfide and/or said sulfur forms a sulfur compound with, onto, into, in response to, within, with the assistance of, and/or on a surface of at least a portion of said second material (40'), to separate said hydrogen sulfide and/or said sulfur from said processed gas mixture and produce said sulfur-depleted gas.

In embodiments, the first vessel (10) produces hydrogen. In embodiments, the hydrogen is produced in the first vessel (10) in the presence of a first material (40) in a partial oxidation process, an autothermal reforming process, a steam reforming process, a hydrogen production process, water gas shift reaction, a Sabatier reaction, and/or methanation. In the second vessel (10'), with or without the addition of a fluid (FLD), and in the presence of a second material (40'), halogens and/or sulfur within the gas, dissociate, react, combine, adsorb, absorb, deposit, fuse, attract, adhere, cling, bind, unite, join, assimilate, polymerize, and/or catalyze, with, onto, into, in response to, within, with the assistance of, and/or on a surface of at least a portion of said second material, to convert the halogen into acid, and the sulfur into hydrogen sulfide.

A third vessel (10n) positioned downstream of the second vessel (10') is configured to accept the gas evacuated from the second vessel (10'). A third material (10n) is included within the third vessel (10n), wherein at least a portion of the acid generated in the first vessel (10) and/or the second vessel (10') is removed by the third material (10n). The acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said third material (10n), to separate at least a portion of said acid the gas evacuated from the second vessel (10').

In embodiments, at least a portion of said gas, other than said halogen, produces a secondary compound within the first vessel (10) and/or the second vessel (10') and can be removed in the second vessel (10'), third vessel (10n), fourth vessel (10n1), in a fifth vessel (10n2), and/or in a sixth vessel (10n3). In embodiments, the secondary compound comprises one or more secondary compounds selected from the group consisting of hydrogen, a hydrocarbon, a halogenated hydrocarbon, said acid, a sulfur compound, a salt, carbon, carbon monoxide, water, an ion, an anion, a cation, a free radical, an unsaturated compound, an unsaturated hydrocarbon, a polymer, green oil, an organic chloride, a metal complex, ionic polymerization termination, coordination polymerization termination, and free radical polymerization termination.

In embodiments, a halogen-depleted gas is evacuated from the third vessel (10n) and is routed to the first heater (HTR1) to heat the halogen-laden gas (50), and to cool the halogen-depleted gas. After the halogen-depleted gas is heated in the first heater (HTR1) it may be routed to a third vessel (10n) comprising a third material (40n).

The gas may be routed to a fourth vessel (10n1) which is downstream of the third vessel (10n). In embodiments, the fourth vessel (10n1) includes a fourth material (40n1), wherein the fourth material (40n1) is configured to further remove at least a portion of an acid and/or hydrogen sulfide from the gas. Sulfur that was converted into hydrogen sulfide, within the upstream first vessel (10) and/or second vessel (10') is removed in the fourth vessel (10n1) by the fourth material (40n1), wherein the fourth material (40n1) includes one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

In embodiments, the hydrogen sulfide dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said fourth material (40n1), to separate said hydrogen sulfide therefrom.

A fifth vessel (10n2) including a fifth material (40n2) may be used to polish acid and further remove it from the gas. A sixth vessel (10n3) including a sixth material (40n3) may be used to polish hydrogen sulfide and further move it from the gas. Cooling and condensate removal to produce the halogen-depleted gas (55) can be included, as shown in previous drawings.

FIG. 9

Figure 9:
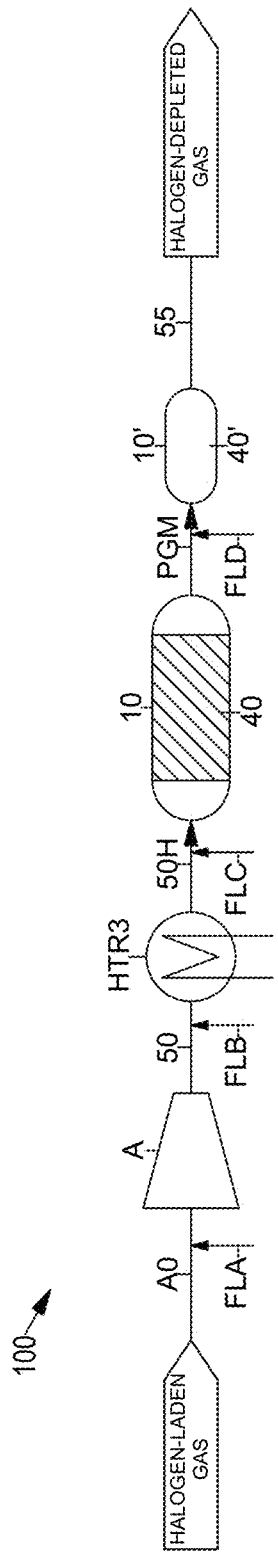
FIG. 9 depicts another non-limiting embodiment of a halogen processing system (100).

FIG. 9 depicts another non-limiting embodiment of a halogen processing system (100). FIG. 9 shows a pre-processing system (A) comprising a pressurization process including a compressor, a heater (HTR3), a first vessel (10) including a first material (40), and a second vessel (10') including a second material (40'). Similar to aforementioned, a gas and/or a gas derived from said source of biogas (A0) is supplied to the pre-processing system (A) at a first pressure where the compressor pressurizes the gas (A0) to produce a pressurized gas at a second pressure, the second pressure is greater than the first pressure.

The pressurized gas comprises the halogen-laden gas (50). The heater (HTR3) heats the pressurized halogen-laden gas (50) to produce a pressurized heated halogen-laden gas (50H). The pressurized heated halogen-laden gas (50H) has a temperature greater than a temperature of the pressurized halogen-laden gas (50). The pressurized heated halogen-laden gas (50H) is then supplied to the first vessel (10) comprising the first material (40). A processed gas mixture (PGM) is then supplied from the first vessel (10) to a second vessel (10') comprising second material (40'), which further processes the gas mixture as described above to produce the halogen-depleted gas (55). As abovementioned, a fluid (FLA, FLB, FLC, FLD) may be supplied to various locations throughout the halogen processing system (100), non-limiting examples are shown in FIG. 9 as upstream of the compressor, upstream of the heater (HTR3), upstream of the first vessel (10), and/or upstream of the second vessel (10').

As described above in detail, the second vessel (10') can serve multi-functional purposes e.g., acid removal, sulfur removal, removal of a primary and/or secondary compound.

In embodiments, this specification describes a method to produce a halogen-depleted gas, comprising:

Paragraph A. A method to produce a halogen-depleted gas, comprising:
- (a) providing a gas derived from and/or including a source of biogas, said gas comprises at least a halogen;
- (b) mixing said gas with a source of hydrogen to produce a processed gas mixture, wherein at least a portion of said halogen reacts with said hydrogen to produce an acid; said processed gas mixture includes said acid; and
- (c) separating said acid from said processed gas mixture to produce said halogen-depleted gas, wherein said halogen-depleted gas comprises a reduced amount of said halogen relative to said gas.

Paragraph B. The method according to Paragraph A, wherein:
in step (b), producing said processed gas mixture in the presence of a catalyst and/or heat.

Paragraph C. The method according to Paragraph A, wherein:
in step (a), said gas comprises sulfur;
in step (b), at least a portion of said sulfur reacts with said hydrogen to produce hydrogen sulfide, said processed gas mixture includes said hydrogen sulfide; and
during, prior to, and/or after step (c), subjecting processed gas mixture and/or said halogen-depleted gas comprising said hydrogen sulfide to a hydrogen sulfide removal process to remove at least a portion of said hydrogen sulfide from said processed gas mixture and/or said halogen-depleted gas and produce a sulfur-depleted gas, said sulfur-depleted gas comprises a reduced amount of said hydrogen sulfide relative to said processed gas mixture and/or said halogen-depleted gas.

Paragraph D. The method according to Paragraph C, wherein:
after said hydrogen sulfide removal process, subjecting said sulfur-depleted gas to an additional sulfur removal step.

Paragraph E. The method according to Paragraph C, comprising:
said hydrogen sulfide removal process comprises supplying said processed gas mixture and/or said halogen-depleted gas to a material, said material removes said hydrogen sulfide from said processed gas mixture and/or said halogen-depleted gas to produce said sulfur-depleted gas; and one or more selected from the group consisting of:
said sulfur dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to remove said sulfur from said processed gas mixture and/or said halogen-depleted gas and produce said sulfur-depleted gas;
said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite;
said processed gas mixture and/or said halogen-depleted gas includes water vapor; and supplying said processed gas mixture and/or said halogen-depleted gas to a water removal process to remove at least a portion of said water vapor therefrom.

Paragraph F. The method according to Paragraph A, wherein:
in step (c), separating said acid from said processed gas mixture with a material, said material separates said acid from said processed gas mixture to produce said halogen-depleted gas.

Paragraph G. The method according to Paragraph F, wherein:
said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to separate said acid from said processed gas mixture and produce said halogen-depleted gas.

Paragraph H. The method according to Paragraph F, wherein:
said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

Paragraph I. The method according to Paragraph F, wherein:
aid acid forms a salt, a compound, and/or a sulfur compound with, onto, into, in response to, within, with the assistance of, and/or on a surface of at least a portion of said material, to separate said acid from said processed gas mixture and produce said halogen-depleted gas.

Paragraph J. The method according to Paragraph A, wherein:
said hydrogen comprises a gas and/or said hydrogen is derived from one or more selected from the group consisting of a partial oxidization process, an autothermal reforming process, a steam reforming process, a hydrogen production process, water gas shift reaction, a Sabatier reaction, methanation, an electrolysis process, a source of biogas, water, an alcohol, and a hydrocarbon.

Paragraph K. The method according to Paragraph A, wherein:
before step (a), said gas has been subjected to a carbon dioxide removal process.

Paragraph L. The method according to Paragraph A, wherein:
in step (c), said halogen-depleted gas includes carbon dioxide and/or carbon monoxide; and
supplying said halogen-depleted gas to a carbon dioxide removal process to remove at least at least a portion of said carbon dioxide therefrom and to produce a carbon dioxide-depleted gas, wherein said carbon dioxide-depleted gas includes a reduced amount of carbon dioxide relative to said halogen-depleted gas; and/or supplying said halogen-depleted gas to a carbon monoxide removal process to remove at least at least a portion of said carbon monoxide therefrom and to produce a carbon monoxide-depleted gas, wherein said carbon monoxide-depleted gas includes a reduced amount of carbon monoxide relative to said halogen-depleted gas.

Paragraph M. The method according to Paragraph A, wherein:
said gas and/or said processed gas mixture comprises oxygen; and comprising one or more selected from the group consisting of:
in step (b), at least a portion of said oxygen is reacted, mixed, converted, and/or consumed to produce said processed gas mixture, wherein said processed gas mixture includes a reduced amount of oxygen relative to said gas;
in step (c), at least a portion of said oxygen is reacted, mixed, converted, and/or consumed to produce said halogen-depleted gas, wherein said halogen-depleted gas includes a reduced amount of oxygen relative to said processed gas mixture; and
said oxygen is reacted with one or more selected from the group consisting of volatile organic compound, a sulfur-containing compound, the halogenated volatile organic compound, an alcohol, water, a hydrocarbon, methane, a catalyst, and a scavenger.

Paragraph N. The method according to Paragraph A, wherein:
in step (c), said halogen-depleted gas includes water vapor; and
(d) supplying said halogen-depleted gas to a water removal process to remove at least a portion of said water vapor therefrom.

Paragraph O. The method according to Paragraph A, wherein:
in step (b), wherein at least a portion of said gas, other than said halogen, produces a secondary compound in response to said hydrogen or lack thereof.

Paragraph P. The method according to Paragraph O, wherein:
in steps (b), (c), and/or after step (c), separating said secondary compound from said processed gas mixture and/or said halogen-depleted gas to produce a secondary compound-depleted gas, wherein said secondary compound-depleted gas comprises a reduced amount of said secondary compound relative to said processed gas mixture and/or said halogen-depleted gas; wherein:
said secondary compound comprises one or more secondary compounds selected from the group consisting of a hydrogen, hydrocarbon, a halogenated hydrocarbon, said acid, a sulfur compound, a salt, carbon, carbon monoxide, water, an ion, an anion, a cation, a free radical, an unsaturated compound, an unsaturated hydrocarbon, a polymer, green oil, an organic chloride, a metal complex, ionic polymerization termination, coordination polymerization termination, and free radical polymerization termination.

Paragraph Q. The method according to Paragraph O, wherein:
in steps (b), (c), and/or after step (c), separating said secondary compound from said processed gas mixture and/or said halogen-depleted gas with a material, said material separates said secondary compound from said processed gas mixture and/or said halogen-depleted gas to produce said secondary compound-depleted gas;
said secondary compound dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to separate said secondary compound from said processed gas mixture and/or said halogen-depleted gas and produce said secondary compound-depleted gas.

Paragraph R. The method according to Paragraph Q, wherein:
said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

Paragraph S. The method according to Paragraph A, comprising:
(d) producing a product from at least a portion of said halogen-depleted gas, said product comprises one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, a hydrocarbon, a lipid, an emulsion, diesel, said acid, a sulfur compound, a salt, carbon, carbon monoxide, water, and power.

Paragraph T. The method according to Paragraph A, wherein:
before step (a), at least a portion of said gas has been subjected to one or more processes selected from the group consisting of a water removal process, pre-pressurization with at least one blower, a hydrogen sulfide removal process, a siloxane removal process, chilling, pressurization, a volatile organic compound removal process, a carbon monoxide removal process, a carbon dioxide removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a temperature swing adsorption water removal process, and processing in a bioreactor including microorganisms; and
(d) subjecting at least a portion of said halogen-depleted gas to a post-processing step to produce post-processed gas, said post-processing step includes one or more processes selected from the group consisting of a water removal process, pressurization with at least one blower, a hydrogen sulfide removal process, a siloxane removal process, chilling, pressurization, a volatile organic compound removal process, a carbon monoxide removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam reforming process, a water gas shift process, a methanation process, a Sabatier reaction process, a catalytic process, an ammonia production process, processing in a fuel cell, and a bioreactor including microorganisms; and (e) producing a product from said post-processed gas, said product comprises one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, a hydrocarbon, a lipid, an emulsion, diesel, said acid, a sulfur compound, a salt, carbon, carbon monoxide, water, and power.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variations of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of halogen processing system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

What is claimed is:

1. A method to produce a halogen-depleted gas, comprising:
   (a) providing a gas derived from and/or including a source of biogas, said gas comprises at least a halogen;

(b) mixing said gas with a source of hydrogen to produce a gas mixture;
(c) subjecting said gas mixture to a reaction in the presence of a catalyst and/or heat to produce a processed gas mixture including an acid, wherein at least a portion of said halogen reacts with said hydrogen within said gas mixture to produce said acid; and
(d) separating said acid from said processed gas mixture to produce said halogen-depleted gas, wherein said halogen-depleted gas comprises a reduced amount of said halogen relative to said gas.

2. The method according to claim 1, wherein:
in step (a), said gas comprises sulfur;
in step (c), at least a portion of said sulfur reacts with said hydrogen to produce hydrogen sulfide, said processed gas mixture includes said hydrogen sulfide; and
during, prior to, and/or after step (d), subjecting said processed gas mixture and/or said halogen-depleted gas comprising said hydrogen sulfide to a hydrogen sulfide removal process to remove at least a portion of said hydrogen sulfide from said processed gas mixture and/or said halogen-depleted gas and produce a sulfur-depleted gas, said sulfur-depleted gas comprises a reduced amount of said hydrogen sulfide relative to said processed gas mixture and/or said halogen-depleted gas.

3. The method according to claim 2, wherein:
after said hydrogen sulfide removal process, subjecting said sulfur-depleted gas to an additional sulfur removal step.

4. The method according to claim 2, comprising:
said hydrogen sulfide removal process comprises supplying said processed gas mixture and/or said halogen-depleted gas to a material, said material removes said hydrogen sulfide from said processed gas mixture and/or said halogen-depleted gas to produce said sulfur-depleted gas; and one or more selected from the group consisting of:
said sulfur dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to remove said sulfur from said processed gas mixture and/or said halogen-depleted gas and produce said sulfur-depleted gas;
said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite; and
said processed gas mixture and/or said halogen-depleted gas includes water vapor; and supplying said processed gas mixture and/or said halogen-depleted gas to a water removal process to remove at least a portion of said water vapor therefrom.

5. The method according to claim 1, wherein:
in step (d), separating said acid from said processed gas mixture with a material, said material separates said acid from said processed gas mixture to produce said halogen-depleted gas.

6. The method according to claim 5, wherein:
said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to separate said acid from said processed gas mixture and produce said halogen-depleted gas.

7. The method according to claim 5, wherein:
said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

8. The method according to claim 5, wherein:
said acid forms a salt, a compound, and/or a sulfur compound with, onto, into, in response to, within, with the assistance of, and/or on a surface of at least a portion of said material, to separate said acid from said processed gas mixture and produce said halogen-depleted gas.

9. The method according to claim 1, wherein:
said hydrogen comprises a gas and/or said hydrogen is derived from one or more selected from the group consisting of a partial oxidization process, an autothermal reforming process, a steam reforming process, a hydrogen production process, water gas shift reaction, a Sabatier reaction, methanation, an electrolysis process, a source of biogas, water, an alcohol, and a hydrocarbon.

10. The method according to claim 1, wherein:
(e) subjecting at least a portion of said halogen-depleted gas to a post-processing step to produce post-processed gas, said post-processing step includes one or more processes selected from the group consisting of a nitrogen removal process, a cryogenic gas separation process, and a cryogenic distillation process.

11. The method according to claim 1, wherein:
in step (d), said halogen-depleted gas includes carbon dioxide and/or carbon monoxide; and
supplying said halogen-depleted gas to a carbon dioxide removal process to remove at least a portion of said carbon dioxide therefrom and to produce a carbon dioxide-depleted gas, wherein said carbon dioxide-depleted gas includes a reduced amount of carbon dioxide relative to said halogen-depleted gas; and/or
supplying said halogen-depleted gas to a carbon monoxide removal process to remove at least a portion of said carbon monoxide therefrom and to produce a carbon monoxide-depleted gas, wherein said carbon monoxide-depleted gas includes a reduced amount of carbon monoxide relative to said halogen-depleted gas.

12. The method according to claim 1, wherein:
said gas and/or said gas mixture comprises oxygen; and comprising one or more selected from the group consisting of:
in step (c), at least a portion of said oxygen is reacted, mixed, converted, and/or consumed to produce said processed gas mixture, wherein said processed gas mixture includes a reduced amount of oxygen relative to said gas;

in step (d), at least a portion of said oxygen is reacted, mixed, converted, and/or consumed to produce said halogen-depleted gas, wherein said halogen-depleted gas includes a reduced amount of oxygen relative to said gas mixture; and said oxygen is reacted with one or more selected from the group consisting of volatile organic compound, a sulfur-containing compound, the halogenated volatile organic compound, an alcohol, water, a hydrocarbon, methane, a catalyst, and a scavenger.

13. The method according to claim 1, wherein:

in step (d), said halogen-depleted gas includes water vapor; and (e) supplying said halogen-depleted gas to a water removal process to remove at least a portion of said water vapor therefrom.

14. The method according to claim 1, wherein:

in step (c), wherein at least a portion of said gas, other than said halogen, produces a secondary compound in response to said hydrogen or lack thereof.

15. The method according to claim 14, wherein:

in steps (c), (d), and/or after step (d), separating said secondary compound from said processed gas mixture and/or said halogen-depleted gas to produce a secondary compound-depleted gas, wherein said secondary compound-depleted gas comprises a reduced amount of said secondary compound relative to said processed gas mixture and/or said halogen-depleted gas; wherein:

said secondary compound comprises one or more secondary compounds selected from the group consisting of a hydrocarbon, a halogenated hydrocarbon, a sulfur compound, a salt, carbon, carbon monoxide, water, an ion, an anion, a cation, a free radical, an unsaturated compound, an unsaturated hydrocarbon, a polymer, green oil, an organic chloride, a metal complex, ionic polymerization termination, coordination polymerization termination, and free radical polymerization termination.

16. The method according to claim 14, wherein:

in steps (c), (d), and/or after step (d), separating said secondary compound from said processed gas mixture and/or said halogen-depleted gas with a material, said material separates said secondary compound from said processed gas mixture and/or said halogen-depleted gas to produce said secondary compound-depleted gas;

said secondary compound dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to separate said secondary compound from said processed gas mixture and/or said halogen-depleted gas and produce said secondary compound-depleted gas.

17. The method according to claim 16, wherein:

said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite.

18. The method according to claim 1, comprising:

(e) producing a product from at least a portion of said halogen-depleted gas, said product comprises one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, a hydrocarbon, a lipid, an emulsion, diesel, said acid, a sulfur compound, a salt, carbon, carbon monoxide, water, and power.

19. The method according to claim 1, wherein:

at least a portion of said gas provided in step (a) has been subjected to one or more processes selected from the group consisting of a water removal process, pre-pressurization with at least one blower, a hydrogen sulfide removal process, a siloxane removal process, chilling, pressurization, a volatile organic compound removal process, a carbon monoxide removal process, a carbon dioxide removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a temperature swing adsorption water removal process, and processing in a bioreactor including microorganisms; and (e) subjecting at least a portion of said halogen-depleted gas to a post-processing step to produce a post-processed gas, said post-processing step includes one or more processes selected from the group consisting of a pressurization with at least one blower, a hydrogen sulfide removal process, a siloxane removal process, chilling, pressurization, a volatile organic compound removal process, a carbon monoxide removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam reforming process, a water gas shift process, a methanation process, a Sabatier reaction process, a catalytic process, an ammonia production process, processing in a fuel cell, and a bioreactor including microorganisms; and (f) producing a product from said post-processed gas, said product comprises one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, a hydrocarbon, a lipid, an emulsion, diesel, said acid, a sulfur compound, a salt, carbon, carbon monoxide, water, and power.

20. The method according to claim 1, wherein:

in step (c), said reaction produces additional hydrogen, and reacting at least a portion of said halogen with said additional hydrogen within said processed gas mixture to produce said acid.

21. The method according to claim 1, wherein:
said source of hydrogen is supplied as a gas.

22. The method according to claim 1, wherein:
said source of hydrogen is supplied as water.

23. The method according to claim 1, wherein:
said source of hydrogen is produced in one or more processes selected from the group consisting of a partial oxidization process, an autothermal reforming process, a steam reforming process, a hydrogen production process, water gas shift reaction, a Sabatier reaction, methanation, and an electrolysis process.

24. The method according to claim 1, wherein:
said source of hydrogen is derived from one or more selected from the group consisting of a volatile organic compound, a sulfur-containing compound, a hydrocarbon, a separate source of biogas, an alcohol, and a source of methane.

25. A method to produce a processed gas, comprising:
(a) providing a gas derived from and/or including a source of biogas, said gas comprises at least a halogen;
(b) mixing said gas with a source of hydrogen to produce a gas mixture;
(c) subjecting said gas mixture to a reaction in the presence of a catalyst and/or heat to produce a processed gas mixture including an acid, wherein at least a portion of said halogen reacts with said hydrogen within said gas mixture to produce said acid;
(d) separating said acid from said processed gas mixture to produce said halogen-depleted gas, wherein said halogen-depleted gas comprises a reduced amount of said halogen relative to said gas; and
(e) subjecting at least a portion of said halogen-depleted gas to a processing step to produce said processed gas, said processing step includes one or more processes selected from the group consisting of a nitrogen removal process, a cryogenic gas separation process, and a cryogenic distillation process.

26. The method according to claim 25, wherein:
in step (d), separating said acid from said processed gas mixture with a material, said material separates said acid from said processed gas mixture to produce said halogen-depleted gas; and one or more selected from the group consisting of:

(i) said acid dissociates, reacts, combines, adsorbs, absorbs, deposits, fuses, attracts, adheres, clings, binds, unites, joins, assimilates, polymerizes, and/or catalyzes, with, onto, into, in response to, within, with the assistance of, and/or on a surface of at least a portion of said material, to separate said acid from said processed gas mixture and produce said halogen-depleted gas;

(ii) said material comprises one or more materials selected from the group consisting of activated alumina, activated carbon, alumina, caustic, carbon, carbon nanotubes, a metal, a plurality of metals, catalyst, ceramic material, chitosan, chitin, clay, a dry scrubbing agent, an engineered reactant, iron sponge, an ion-exchange resin, media, molecular sieve, a polymeric adsorbent, absorbent, promoted alumina, a reactant, a scavenger, silica gel, a base, a neutralizing agent, a pH buffer, and a zeolite; and (iii) said acid forms a salt, a compound, and/or a sulfur compound with, onto, into, in response to, within, with the assistance of, and/or on a surface of at least a portion of said material, to separate said acid from said processed gas mixture and produce said halogen-depleted gas.

27. The method according to claim 25, wherein:
in step (c), said reaction produces additional hydrogen, and reacting at least a portion of said halogen with said additional hydrogen within said processed gas mixture to produce said acid.

28. The method according to claim 25, wherein:
said source of hydrogen is derived from one or more selected from the group consisting of water, a volatile organic compound, a sulfur-containing compound, a hydrocarbon, a separate source of biogas, an alcohol, and a source of methane.

29. The method according to claim 25, wherein:
said source of hydrogen is produced in one or more processes selected from the group consisting of a partial oxidization process, an autothermal reforming process, a steam reforming process, a hydrogen production process, water gas shift reaction, a Sabatier reaction, methanation, and an electrolysis process.

* * * * *